United States Patent [19]

Baratz et al.

[11] Patent Number: 4,914,571
[45] Date of Patent: Apr. 3, 1990

[54] LOCATING RESOURCES IN COMPUTER NETWORKS

[75] Inventors: Alan E. Baratz, Chappaqua, N.Y.; Inder S. Gopal, Fort Lee, N.J.; James P. Gray, Chapel Hill, N.C.; George A. Grover, Mahopac; Jeffrey M. Jaffe, Monsey, both of N.Y.; Jean A. Lorrain; Melinda R. Pollard, both of Raleigh, N.C.; Diane P. Pozefsky; Mark Pozefsky, both of Chapel Hill, N.C.; Lee M. Rafalow, Durham, N.C.

[73] Assignee: International Business Machines Corporation, Armonk, N.Y.

[21] Appl. No.: 62,269

[22] Filed: Jun. 15, 1987

[51] Int. Cl.[4] .............................. G06F 13/00
[52] U.S. Cl. .................... 364/200; 364/284.4; 364/242.94
[58] Field of Search ... 364/200 MS File, 900 MS File

[56] References Cited

U.S. PATENT DOCUMENTS

| | | | |
|---|---|---|---|
| 4,423,414 | 12/1983 | Bryant et al. | 340/825.07 |
| 4,644,496 | 2/1987 | Andrews | 364/900 |
| 4,677,588 | 6/1987 | Benjamin et al. | 364/900 |
| 4,754,395 | 6/1988 | Weisshaar | 364/200 |

OTHER PUBLICATIONS

Sams, J. G., "Node Processor for Distributed System Control", IBM Technical Disclosure Bulletin, vol. 23, No. 5, 10/80, pp. 1811-1812.

*Primary Examiner*—Gareth D. Shaw
*Assistant Examiner*—Debra A. Chin
*Attorney, Agent, or Firm*—Thomas F. Galvin; Gerald R. Woods

[57] ABSTRACT

A LOCATE search dynamically locates resources (e.g., logical units (LUs) and transaction program and files associated with LUs) in a computer network so that a session can be established between the origin and the destination of the search.

In a network which includes end nodes associated with server nodes, a resource contained in any node is located by a requesting node. The requesting node initiates a search of the resources residing within itself. If the resource does not reside in the requesting node, the server node searches the resources known to the server node that reside anywhere in the nework. If the resource is not known by the server node, it searchers all resources that reside in its associated end nodes. If the resource does not reside in the associated end nodes, either a request is sent to a central directory if one exists or a search of all resources in the network is made.

24 Claims, 17 Drawing Sheets

FIG. 2
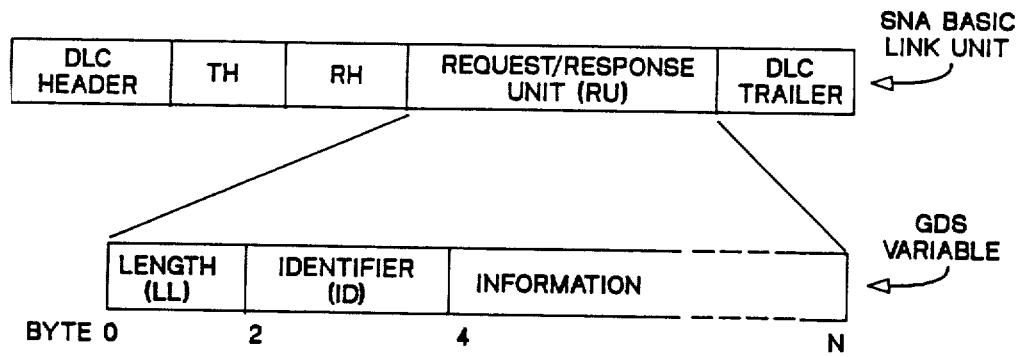
SEARCH REQUEST
SUCCESSFUL SEARCH REPLY
UNSUCCESSFUL SEARCH REPLY
FIG. 3

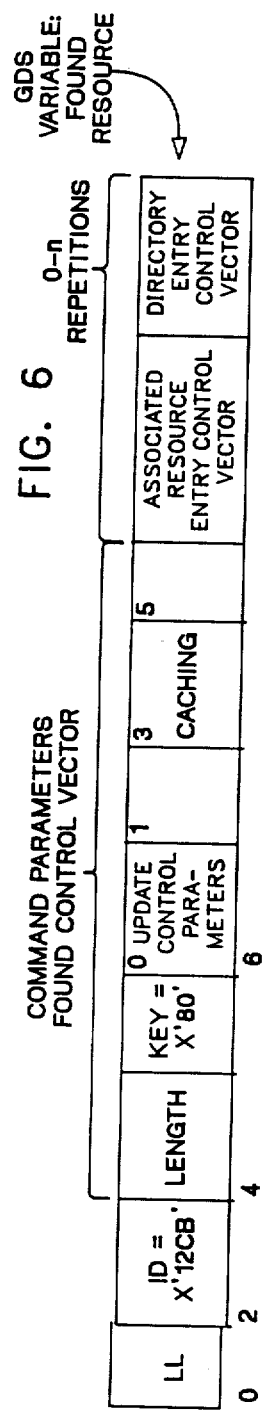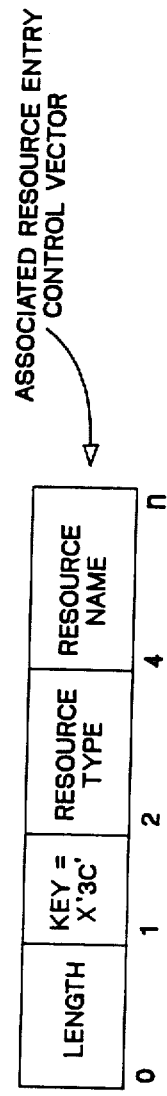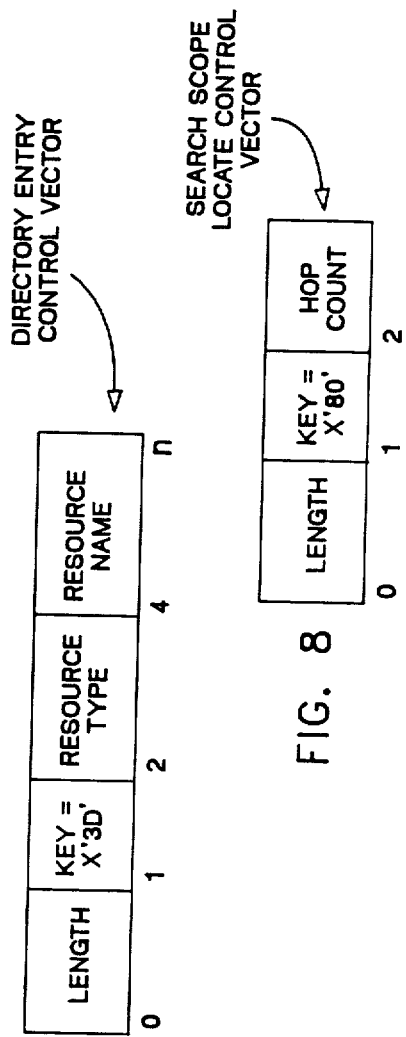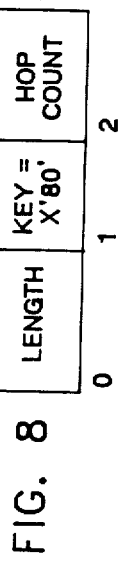
FIG. 6
FIG. 8

| | LENGTH | KEY = X'3C' | RESOURCE TYPE | RESOURCE NAME |
|---|---|---|---|---|
| | 0 | 1 | 2 | 4 ... n |

FIG. 7A  ← ASSOCIATED RESOURCE ENTRY CONTROL VECTOR

| | LENGTH | KEY = X'3D' | RESOURCE TYPE | RESOURCE NAME |
|---|---|---|---|---|
| | 0 | 1 | 2 | 4 ... n |

FIG. 7B  ← DIRECTORY ENTRY CONTROL VECTOR

| | LENGTH | KEY = X'81' | RESOURCE TYPE | RESOURCE NAME |
|---|---|---|---|---|
| | 0 | 1 | 2 | 4 ... n |

FIG. 7C  ← SEARCH ARGUMENT ASSOCIATED RESOURCE FIND CONTROL VECTOR

| | LENGTH | KEY = X'82' | RESOURCE TYPE | RESOURCE NAME |
|---|---|---|---|---|
| | 0 | 1 | 2 | 4 ... n |

FIG. 7D  ← SEARCH ARGUMENT DIRECTORY ENTRY FIND CONTROL VECTOR

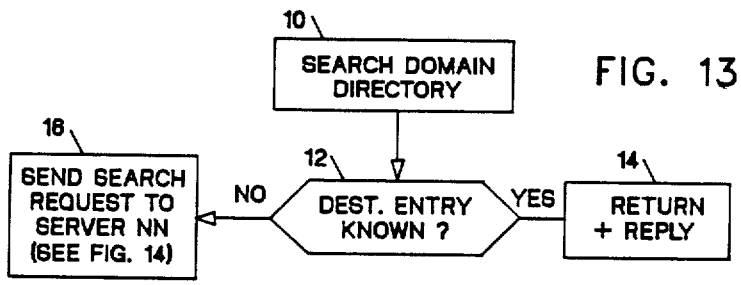
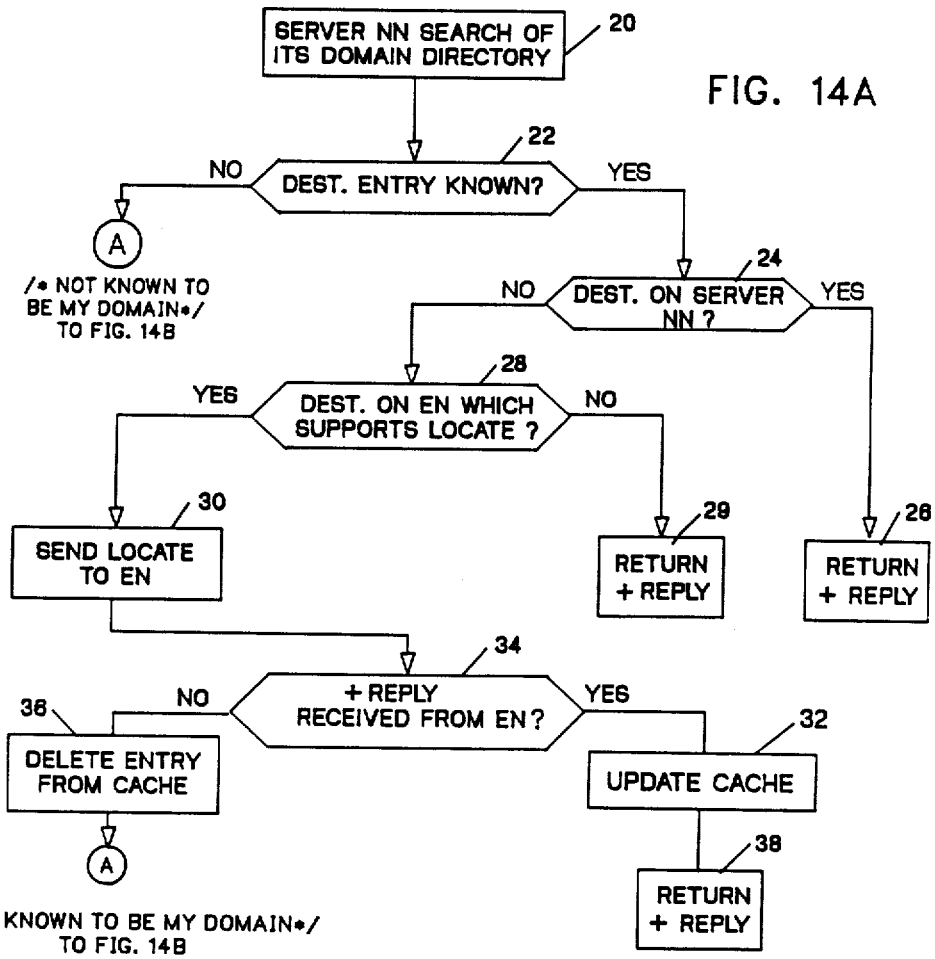

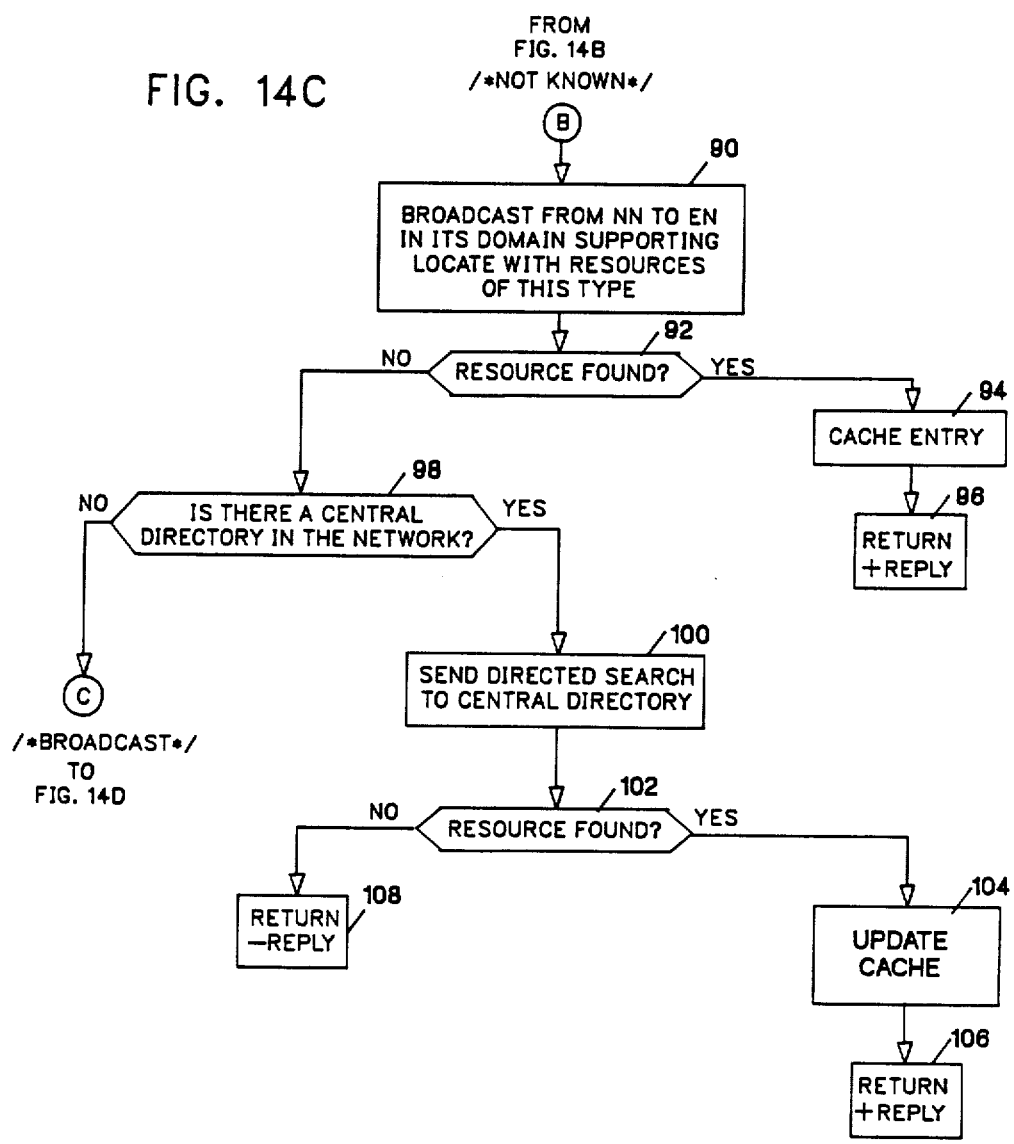

FIG. 15B  /* RECEIPT OF A LOCATE REQUEST */
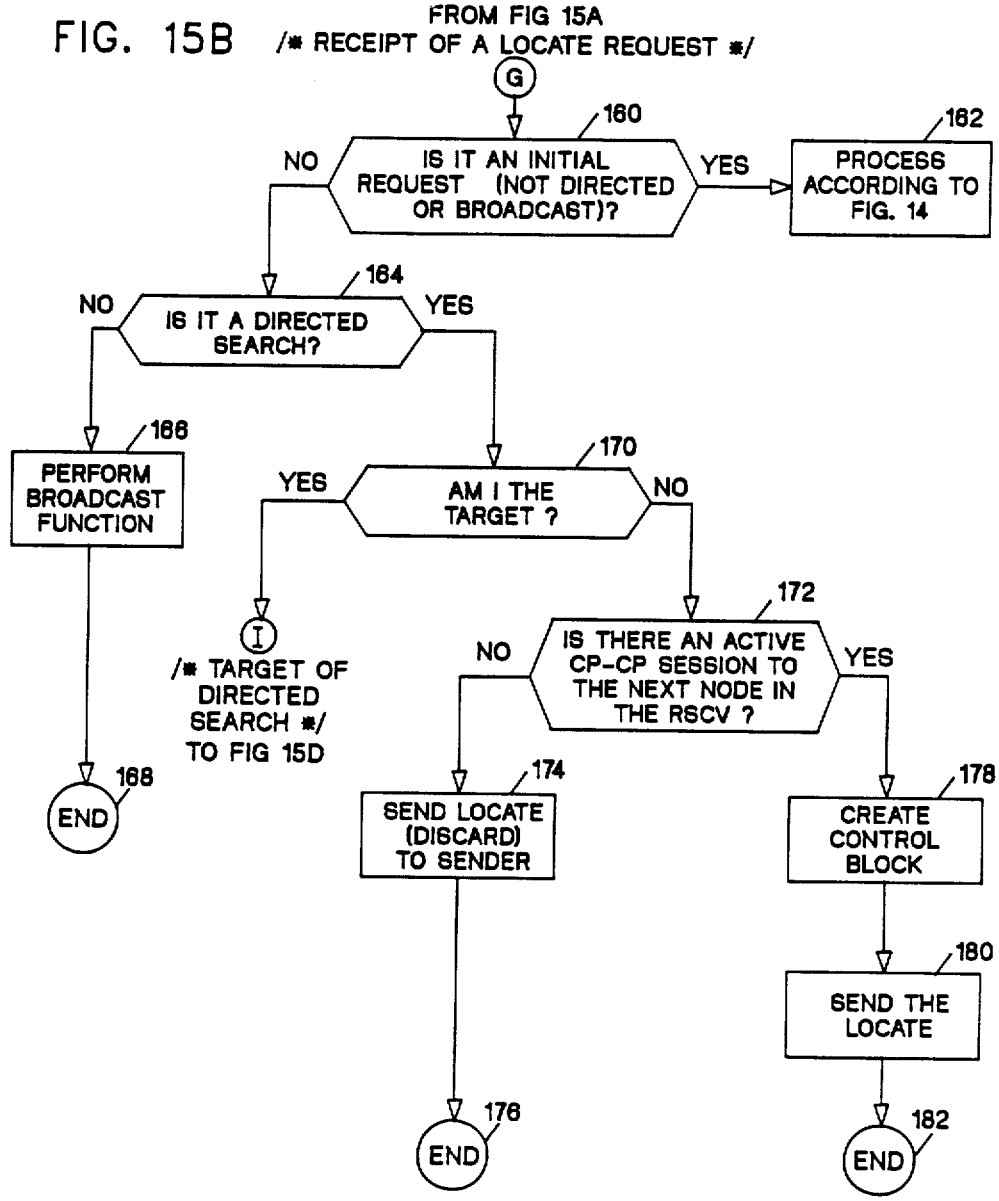

LOCATING RESOURCES IN COMPUTER NETWORKS

BACKGROUND OF THE INVENTION

1. Related Patent Applications

U.S. Pat. No. 4,827,411 by A. H. Arrowood et al, issued May 2, 1989, and entitled "Method of Maintaining a Topology Database" discloses a technique for maintaining a common database of information distributed at plural nodes of a network relating to the topology of physical links between nodes as well as the topology of physical and logical resources at said nodes.

Copending patent application Ser. No. 062,280 by A. E. Baratz et al, filed June 15, 1987, and entitled "Method for Exchanging Network Control Information," discloses a technique for facilitating the flow of control information between nodes in networks capable of distributed control.

2. Field of the Invention

The present invention relates to computer networks. More particularly, it relates to a method for finding a target resource in a network.

3. Prior Art

Computer networks for processing and transmitting data are well known. A typical computer network system comprises at least one host computer running under some type of operating system, communication controllers, communications media and a plurality of end users (terminals, printers, displays, etc.). The host computer is connected, via communications media, to either a communication controller or an end user terminal. The communication controller interfaces with other communication controllers or end user terminals via communications media. The communications media may be telephone lines, channels, satellites, etc. By entering a request at a user's terminal, the user may extract data from the host computer. Similarly, a user may enter information on a terminal through which it is transmitted to a host computer for processing and/or to another terminal in the network.

Computing systems are controlled by a system architecture that ensures the orderly flow of information throughout the system. The prior art describes several types of architectures. For example, an overview of the architecture used in computer networks is given in an article entitled, "Computer Network Architecture," by S. Wecker in *Computer*, September 1979. Another overview, including a description of System Network Architecture (SNA) is given in an article entitled, "An Introduction to Network Architectures and Protocols," by P. E. Green in the *IBM Systems Journal*, Vol 18, No. 2, 1979. In these articles, the various computer networks such as SNA DNA, ARPANET, etc. are described by means of hierarchical architectural layers, where the lowest layer relates to the physical communication lines interconnecting various user nodes of the network and where the highest level concerns the conversation per se between the various end users of the network.

As networks become more dynamic, the addition and relocation of resources and end users occur more frequently. New procedures are needed to allow customer networks to grow and change more easily. Among other things these procedures must minimize the amount of coordinated system definitions needed and tolerate errors and race conditions in the network.

An article by Baratz et al entitled: "SNA Networks of Small Systems," IEEE J. Selected Areas in Communications, Vol. SAC-3, No. 3, May 1985, addresses the minimization of coordinated system definitions. However, it does not address adequately the means and methods to accomplish the minimization.

Further information on SNA terms and concepts can be found in *Systems Network Architecture Technical Overview*, IBM Publication GC30-3073-2, September 1986.

SUMMARY OF THE INVENTION

It is, therefore, an object of our invention to improve the way resources in a computing network are found.

Another object of our invention is to dynamically find resources in a network to establish a session between nodes.

It is yet another object to provide this improvement in a way that minimizes the network operator's efforts.

These and other objects are achieved by means of a method, termed a LOCATE search, which dynamically locates resources (e.g., logical units (LUs) and transaction programs and files contained in LUs) in the network so that an LU-LU session can be established between the origin LU and the destination LU of the search.

In our preferred embodiment, an end node first searches its local resources (those that reside in it). (An end node is a node at the edge of the network that uses, but does not provide, network services). If the resource (destination) is not found, the end node sends a search request to its network (server) node. (A network node is an intermediate node in the network that provides network services to components in itself and in end nodes attached to it.) (Alternatively, the search may be instituted initially at the network node.) The server node searches its directory of domain resources first (those resources that reside in the server node doing the search and in those resources known by the server node to reside in the end nodes served by it). If the resource is not its domain directory, the server node performing the search checks resources of other network nodes that are known. By the word "known" we mean that a resource is listed in any of the directories of a node. If the resource is known to be in another node, a directed search is sent to the node believed to contain the requested resource. If the resource is not known or is not found with the directed search, the server broadcasts to end nodes in its domain that have indicated that they may be searched for resources of the requested type. If the resource is not located in the server's domain and a central directory exists in the network, then the request is forwarded to a central directory using a directed search. If a central directory does not exist or if the node is unable to route to a directed search to a central directory because of link outages, a broadcast search is performed. If the resource is not found by the broadcast and the network ID of the resource indicates a network other than the present network, the request is forwarded with a directed search to a gateway node, if one exists.

Our invention also includes novel messages which flow in the network to perform the search requests and replies.

A principal advantage of our invention is that the user need only define the local resources at a node. Other nodes in the network acquire, (by directed or broadcast search), information concerning a resource as they require it.

BRIEF DESCRIPTION OF THE DRAWINGS

FIG. 2 shows the standard format for the SNA basic link unit and the standard format for a general data stream (GDS) variable in SNA.

FIG. 3 shows the formats for a search request, successful search reply and an unsuccessful search reply, respectively, all in accordance with our invention.

FIG. 6 shows a format for the GDS variable FOUND RESOURCE in accordance with our invention.

FIGS. 7A-7D shows formats for the control vectors termed Associated Resource Entry, Directory Entry, Search Argument Associated Resource FIND, and Search Argument Directory FIND in accordance with our invention.

FIG. 8 shows the format for a Search Scope Control Vector in accordance with our invention.

FIGS. 13 and 14A-14D are flow charts of a computer program illustrating the operation of our invention.

FIGS. 15A-15E are a flow chart of a computer program illustrating other aspects of our invention.

DETAILED DESCRIPTION OF THE PREFERRED EMBODIMENT

Our invention is a general method to locate resources that are in a computer network. The use of our invention is not restricted to any specific type of computer network. It works well with the IBM SNA architecture and will be described in that environment.

An overview of methods for dynamically locating resources is given in the article entitled "SNA Networks of Small Systems" by Baratz et al in the IEEE J. Selected Areas in Communications, Vol. SAC-3, No. 3, May 1985. This article is incorporated herein by reference. However, this description in terms of SNA systems should not be construed as a limitation on the scope of our invention, as it is within the capabilities of one skilled in the computing art to use the invention in other types of networks.

There are two types of nodes in a system which can utilize the invention: network nodes (NNs) and end nodes (ENs). An NN provides session establishment, directory services and session traffic routing services to other nodes for its own Logical Units (LUs) and for LUs in lower function nodes, ENs.

Each node, EN or NN, is responsible for maintaining a directory of its local resources. In addition, each NN is responsible for maintaining directory information about resources that reside in ENs served by it. This is done by system definition (sysdef), either of all of the resource names or of the EN's status as an authorized node that is allowed to dynamically inform its serving NN of its resources. Such as NN is termed a server, and the combination of a server NN and the ENs it serves is termed a domain.

All nodes communicate via control-point-to-control-point (CP-CP) sessions. An network node has two CP-CP sessions with each physically adjacent network node. Each session can be characterized as a one-way pipe over which very short transactions flow; each of the two sessions between adjacent network nodes carries traffic in one direction only. Thus, CP-CP communication between network nodes can be thought of as a full-duplex connection. Upon link activation, each network node attempts to set up a CP-CP session with the node at the other end of the link if it is a network node. CP-CP sessions between network nodes always begin with a CP-Capabilities exchange. There is also a CP-CP session established between an end node and the network node that serves it. This is described fully in copending application Ser. No. 062,290 by Baratz et al.

The directory search procedure is a part of the directory services component of an network node. Its function is to find the location of the target resource of a session request. The resource locations are dynamic. The ability of the directory search procedure to find the current location of a requested resource enables session services to direct its session establishment flows (BINDs) and decreases the occurrence of failed session establishment requests.

Figure 1:
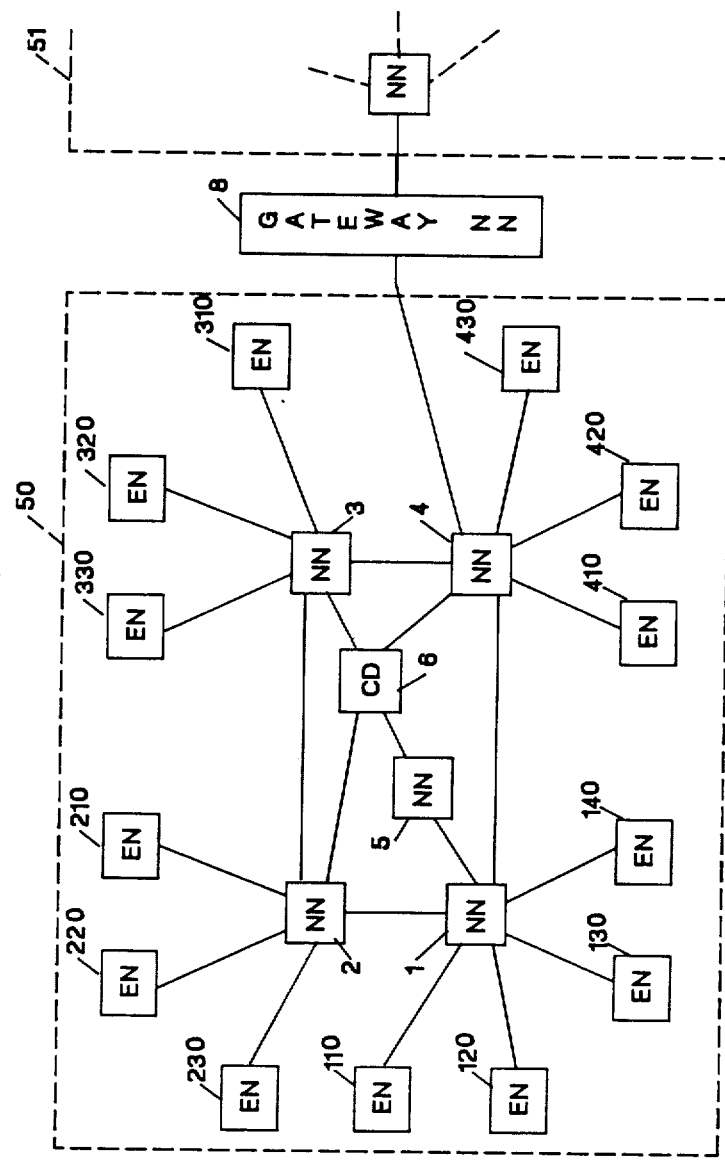
FIG. 1 is a block diagram of the physical components of a computer network.

FIG. 1 is a representation of a typical network in which the LOCATE method is preferably used to find the location of a target resource. Block 50 is a sub-network which includes a set of network nodes, abbreviated as NN, another set of End Nodes, abbreviated as EN, and a central directory, CD.

Each of these nodes contain one or more network addressable units (NAUs). A NAU represents an entity to the network and allows traffic to be routed to it. A logical unit (LU) is a user NAU through which an end user accesses the network. Each EN and NN typically supports one or more LUs. In addition, each EN and NN contains a control point (CP) that provides control functions such as LU-LU session initiation and termination. CPs communicate with each other via CP-CP sessions.

Typically, each EN and NN is also provided with associated application programs, I/O devices and data bases (not shown), which are contained in its associated LUs. The LUs of ENs and NNs, such as 230 and 310 or 120 and 4, communicate over a logical connection called a "session."

Multiple sessions can also be established between two LUs, as is well known in the prior art. A session is established when one LU sends another an SNA request known as the "BIND" which specifies the protocols that both partners agree to abide by for the duration of the session. The "BIND" sender and receiver are known respectively as the primary LU (PLU) and secondary LU(SLU).

A more detailed description relative to session establishment, etc. can be found in the "IBM Systems Network Architecture Format & Protocol Reference Manual: Architecture Logic" (SC30-3112).

A network may have one or more central directory (CD) nodes. These are network nodes which provide a large cache of directory entries and may be used by other nodes to find resources that have already been located by other requesters.

Connections between sub-networks are accomplished via Gateway NNs. In FIG. 1, Gateway NN 8 connects sub-networks 50 and 51.

Each node CP maintains directory information about resources in the node. That information includes the resource name, type, and, for non-LU resources, the LU associated with the resource. The composite of all of the directories of local resources provides a distributed network directory.

In addition to the local resource directory, there are three kinds of directory entries in an NN: its own domain resources, cross-domain resources, and cross-network resources. All directory entries contain the CP name at which the resource is located; for resources other than LUs, the directory entry also contains the LU associated with the resource. Entries for cross-domain resources additionally contain the network node control point (NNCP) that provides directory and session services for that control point and entries for cross-network resources further contain the NNCP providing gateway network node (GNN) services for sessions between the origin LU and the destination resource.

These entries may be accumulated in several ways: by system definition input; by retaining the results of earlier successful searches (caching) and by searching the topology database for a CP name match.

Cache entries, whether added dynamically or at system definition, are only to direct the subsequent LOCATE. If the LOCATE search fails or if the search succeeds, but the BIND fails because the resource is not found (e.g., the resource moved or failed in the window between receipt of the LOCATE and receipt of the BIND), then the erroneous cache entry is deleted. As necessary, a "least recently used" algorithm may be applied to dynamically added cache entries to make room for new entries. This type of algorithm is well known in the art and forms no part of our invention.

LOCATE PROCEDURE

The objective of the LOCATE procedure is to locate resources (e.g., LUs, transaction programs or files) in the network so that a session can be established between the originator and the LU which is the target of the search (also referred to as the destination node or destination). The location of a resource is defined to be the owning CP of that resource. A route to the location of the destination resource can be computed by route selection services. Session services then uses the path computed by route selection services to route its session establishment request (BIND).

If an EN initiates the search, it searches its own resources first and, if the resource is not found, forwards the request to its server NN.

The structure of the LOCATE procedure in an NN is to search and local resources first (those that reside in the node doing the search and in those known to reside in end nodes served by it). If the resource is not a local one, the node performing the search checks known resources of other network nodes. These resources may be known to the searching node because they were cached from an earlier search or because the resource being sought is an LU that also is a CP and therefore is in the topology database. In either case, a search is sent to the node believed to contain the target resource. This is known as a "directed" search. If the resource is not known or the directed search fails, the end nodes attached to the NN that are capable of receiving a LOCATE for the resource type of the target resource are searched.

If the resource is not known locally, then the request is forwarded to a CD in the form of a directed search if one exists. If a CD does not exist, a broadcast search is performed. The broadcast search, then, is used only if the location of the resource cannot be found by other means. If the broadcast search fails and the resource name indicates that the resource is in another network, a directed search is sent to a gateway node, if one exists.

BROADCAST SEARCH

The broadcast search floods the network with requests for the location of the target (requested) resource. As the requests flow through the network, they dynamically build a spanning tree of the intermediate routing network. Upon receiving a request, a node sends the request to all of its neighboring nodes, except the one that it came from (referred to as the parent or uptree node), over the CP-CP sessions. Any neighboring node that has already seen this request immediately returns a negative reply because it is already part of the spanning tree and will report the results of its search to its parent, or uptree node. In many cases, adjacent nodes will send out the search request to each other such that they cross during transmission; the receipt of a request from a neighboring node to which a request has already been sent is equivalent to a negative reply.

Any neighboring node that has not yet seen the request searches its local resource directory and all end nodes that it serves that will accept requests for resources of the type requested. The neighboring node also propagates the request to each of its neighboring nodes regardless of whether the local search is successful or not.

There are three reasons for continuing the search even when the resource is found. The first is to guarantee expeditious termination of the search. The second is to assure that only a single response is returned for each copy of the resource. Third, this procedure allows all copies of a resource to be found, which can be useful for situations that require checking the uniqueness of a resource or where the "closest" of a generic resource is sought.

An intermediate node creates a control block for the pending search, indicating the nodes to which it sent the search request (referred to as the children or downtree nodes), and does not consider the search complete until a reply has been received from each of its children. A node does not clean up this control block until the search is complete; at that time a final reply is returned up the tree and the control block is discarded. If a node receives a reply to a search that it does not recognize, it discards the reply, and takes no further action.

Only network nodes participate in a broadcast search; a network node will query the end nodes that it serves that will accept LOCATE messages; but those end nodes do not in turn propagate the broadcast search to other end nodes or to network nodes to which they are connected. An end node will return either a positive or negative reply only to its serving network node.

Each search procedure carries a unique identifier called a fully-qualified procedure correlation identifier (FQPCID), assigned by the originating node. This unique FQPCID is used by a node to correlate a search reply with a search request and to recognize duplicate requests. Since the directory broadcast search method depends on the ability of a parent node to correlate a request with a reply, it is important that the FQPCID be unique in the network. In order to assure uniqueness, when a node originates a directory search, it generates a procedure correlation identifier (PCID) that is locally unique—that is, it does not duplicate any other PCID generated by the node. The node then adds to the front of this PCID its control point (CP) name, which yields a FQPCID. Since CP names are unique within a network, each FQPCID is unique in the network.

When a node receives a search reply from a child node, it uses the FQPCID and the CP name of the replying node to mark an entry in the pending search table of the appropriate control block. If the reply is positive (i.e., contains the location of the requested resource), the node forwards the reply up the tree immediately with an indicator that the search has not completed at that node. When all the children of a node have replied, the node sends a reply that indicates "search complete" to its parent. Once the search of its subtree is complete, a node discards any knowledge of the search. A search can be completed under several error or race conditions since a negative reply is implied by any of the following conditions:

1. a search reply received with the same FQPCID as the search request, indicating search complete but with no location information;
2. a search request received with the same FQPCID as the request sent on the same link; or
3. a failure in the CP-CP session across which the search request was sent.

The reply indicating "search complete" causes the parent node to mark one entry in the appropriate control block. The directory procedure ensures that when the search completes at a given node, knowledge of the search has been discarded by all nodes downtree in the search spanning tree. Hence, when the search has completed at the origin, there should be no network resources wasted by search control blocks still waiting for replies.

The search is successful (although it may not be complete) when a positive reply is received; the search has failed when negative replies have been received for all search requests sent by the origin of the search.

SEARCH FAILURES

When a search fails, the LOCATE reply carries a sense code value indicating the cause of the failure. Some failures are retryable while others are not. When a broadcast has been sent, multiple replies will be received, several of which may be negative. In our preferred embodiment, the search must be classified as one failure type only. The sense code values are hierarchically related in that once a negative reply is received with a higher failure type than the previous type, the search failure is promoted to the new higher type. Thus, at any given time the search origin retains only one sense code for a given search. This sense code determines whether or not the search is retryable.

TERMINATION OF SEARCHES

There are no timing considerations in the directory searches. The procedures are set up in such a way that nodes wait for certain information to be received before sending their replies. This waiting is asynchronous to network events. In the directory search procedures a link outage and an adjacent node failure are treated as a negative reply. If the following conditions are met, the search is guaranteed to terminate regardless of whether or not there is a CP-CP session outage along the search path.

1. Before sending a LOCATE search request to another node, a node checks that there are CP-CP sessions with the adjacent node that enable the node to receive the request and return a reply. If these sessions do not exist, a request is not sent. Since a node waits for a search reply from a partner to which a request has been sent, it is essential that the sending node know if the partner either cannot receive the search or cannot send a reply. Thus, the CP-CP session connectivity needed for sending and receiving is checked.
2. A node must retain knowledge of a search request it has sent until its entire subtree completes (i.e., it receives replies from every node to which it sent the search). When a broadcast is sent, a control block is built listing the adjacent nodes at that time. If, while the broadcast is completing, a new link to the origin node comes up, it is recognized (via the control block) that this link was not included in the search, and therefore no reply is expected from that new adjacent node. Optionally, the node may forward the search down this new subtree in which case this link would be added to the control block.
3. A CP-CP session outage with an adjacent node is treated as a negative reply.
4. In broadcast search, crossing searches with the same correlator are treated at each side as a negative reply. For example, if server 1 sends a search request to server 2 and then receives the same search from server 2, server 1 considers that as a negative reply to its request and does not send a reply. Server 2 does the same.
5. If a node receives the same request that it is currently processing, and this is not a node that it has sent a search request to (as opposed to #4 above), it returns a negative reply and discards this new request; it does not start a new search procedure. For example, server 2 is processing the request from server 0 when it receives the same request from server 1. Server 2 will send a negative reply to server 1, discard that request, and continue processing the request from server 0.
6. If there is a CP-CP session outage along the path of a directed search, nodes on either side of the outage send a negative reply to their respective endpoints.
7. If, at some time, a node receives a reply for a search procedure that it does not recognize, this reply is discarded and no reply is sent by this node.

DEADLOCK DETECTION FOR BROADCAST SEARCHES

Because broadcast searches require the reservation of control blocks to retain information about broadcasts in progress, deadlocks can occur when nodes run out of storage for these control blocks. The following explains how a network node recognizes when a deadlock might occur and performs recovery procedures to guarantee that it does not occur. Instead of using a flow control mechanism (which is the explicit granting of permission to send data) to prevent deadlock, this approach reduces the overhead of messages requesting and granting permission to send data. This tradeoff is beneficial if the frequency of deadlocks and hence the average cost of the subsequent recovery are small.

The directory services component in a network node has a number of LOCATE control blocks and has one LOCATE receive buffer per partner node. A LOCATE control block is the storage used by a node to receive and process a directory search request, including the space to remember the replies from the requests it propagated "downstream" in a broadcast search. A LOCATE receive buffer is used to hold a LOCATE request when sufficient storage is not available to create a LOCATE control block. This buffer enables a node that is out of LOCATE control blocks to at least return a negative reply (indicating the node does not have storage to process the request) to a received LOCATE request thus allowing the requestor to continue with its processing. Since directory requests can be initiated from any node in the network, there is the possibility for two partner nodes (i.e., nodes connected via a CP-CP session) ( e.g., NN1 and NN5 in FIG. 1) to send each other directory requests for different objects. If each node is running low on storage, there is the potential for the two nodes to become deadlocked when the LOCATE requests are exchanged simultaneously using the remaining storage in each node and leaving no room for either node to receive the reply to its request. Now each node is waiting for the other to return a reply that would enable it to free up the storage for that request.

The following situation can potentially cause a deadlock. If the directory services component has used all its LOCATE control blocks, then receives one request which fills up its LOCATE receive buffer and then receives enough requests to fill up the session pacing buffers the node will be forced to drop its receive pacing count to zero. (Pacing is described in publication GC30-3073-2, referenced earlier.) If a node detects that it is out of LOCATE control blocks and its LOCATE receive buffer is full, and its send and receive pacing counts across the sessions upon which it sent the last request are zero, the node assumes that the adjacent node is in the same situation and that they are deadlocked. This is a conservative scheme for deadlock detection: the LOCATE control block pool is shared amongst all partner nodes so replies from other partner nodes (that are not deadlocked) could eventually free control blocks removing the storage shortage at each deadlocked partner.

For an example of a deadlock situation, consider the two nodes of FIG. 1, NN1 and NN5. Each has two LOCATE control blocks and one LOCATE receive buffer. Table I illustrates a situation where deadlock can occur. In this example, NN1 sends two requests to NN5; these requests (1 and 3) are received by NN5 after NN5 sends two requests (2 and 4) to NN1. When NN1 sends the requests, it uses up its two LOCATE control blocks. When NN1 receives request 2 from NN5, it stores the request in its LOCATE receive buffer since there are no remaining LOCATE control blocks. NN1 prepares to return a negative reply to request 2. Now NN1 receives request 4 which fills its last session pacing buffer. The session pacing buffer cannot be emptied into the LOCATE receive buffer since that buffer is full. NN1 cannot free buffers and its receive pacing count on that session is zero. Meanwhile, NN5 is in a similar situation. Requests 2 and 4 filled NN5's two LOCATE control buffers; receiving request 1 filled NN5's LOCATE receive buffer; receiving request 3 filled the last session buffer and NN5 cannot free buffers to increase its receive pacing count from zero. Each node would like to return a negative reply to the request it has in its LOCATE receive buffer thus freeing up that buffer (and possibly the corresponding control block on the other node), but neither can send because neither has any send pacing count. Nodes NN1 and NN5 are in deadlock. Each is in the situation where all LOCATE control blocks are full, the LOCATE receive buffer is full, and the receive and send pacing counts across the CP-CP sessions to the partner sending the request in the LOCATE buffer are zero. The same situation arises no matter how one changes the actual values for the number of control blocks in each node, the number of receive buffers reserved per CP-CP session, or the initial pacing counts.

TABLE I

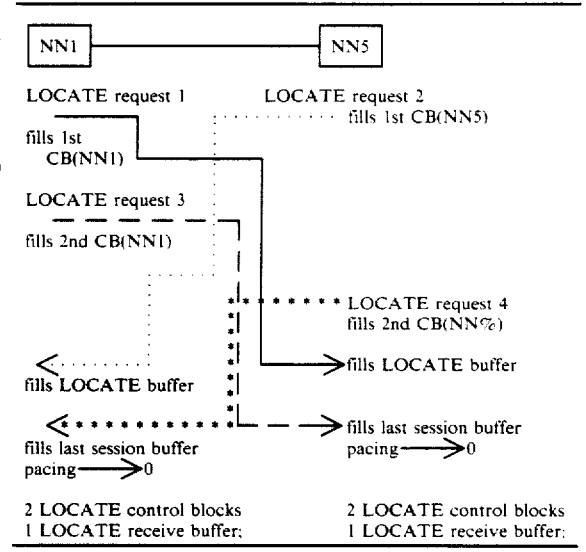

2 LOCATE control blocks
1 LOCATE receive buffer;

2 LOCATE control blocks
1 LOCATE receive buffer;

The solution to the deadlock problem is for each node to UNBIND (i.e., disconnect) the CP-CP session across which it received the LOCATE request that it could not process. Unbinding the session has two beneficial effects. The node that detected the deadlock will throw away this latest LOCATE thus freeing its LOCATE receive buffer. Also, the clean-up processing invoked when a session fails may cause some other LOCATE control blocks to be cleaned up. This would happen if another search request for a different target resource had been sent to that partner but a reply has not been received. When the CP-CP session is disconnected, an implicit negative reply is assumed to have been received. A negative reply will be entered into the control block, and if this is the last outstanding reply for that downtree search, a final reply will be sent to the parent node for the search and the control block will be freed. On the other side of the CP-CP session, the same cleanup will occur, and one or more of its LOCATE control blocks could be freed.

Deadlock detection is also described hereinbelow with respect to FIG. 15.

DIRECTED SEARCHES

Directed searches may be sent by the NNCP of the origin LU, a CD or a gateway node. They are sent by the NNCP to the cached destination CP, to a CD, or to a gateway node.

The NNCP of the origin LU routes the LOCATE on the best path to the destination CP. A route selection control vector is computed that indicates the concatenation of CP-CP sessions that are traversed. The route selection control vector (RSCV) describes the concatenation of sessions between control points instead of specific transmission groups as is done on a BIND and is used to route the directed search. For example, if in FIG. 1, NN1 wishes to send a directed search to NN3, it might select a route of NN1-NN4-NN3 and build an RSCV that indicates a path NN4-NN3.

Each NN along the path, after determining that it is not the destination NN, forwards the directed LOCATE to the next NNCP in the RSCV (e.g., NN4 in the above example); intermediate NNs (those NNs along the path that are not the destination node) do not search their directories (either local or cross-domain) for the search argument upon receipt of directed LOCATEs. In the event that an intermediate network node control point is unable to route the directed LOCATE as indicated, a negative reply LOCATE(discard) is returned.

The destination CP searches its domain resources directory for the search argument resource. If the resource is not in the domain directory, the CP will search end nodes capable of receiving LOCATES for this resource type. If the resource has still not been located, a negative reply is returned. Directed Searches are also described hereinbelow with respect to FIG. 15.

FORMATS

FIG. 2 illustrates the format of the SNA basic link unit (BLU) and of a general data stream (GDS) variable. As illustrated, the GDS is contained in the request-/response unit (RU) of the BLU. An RU may contain multiple GDS variables. Further details concerning the SNA BLU may be found in the IBM manual, "Systems Network Architecture Format and Protocol Reference Manual: Architecture Logic", No. SC30-3112, Chapter 2. Details concerning the GDS variable may be found in the IBM manual, "Systems Network Architecture Format and Protocol Reference Manual: Architecture Logic for LU6.2", NO. SC30-3269, Appendix 1. Both of these manuals are hereby incorporated by reference.

As shown in FIG. 2, the BLU comprises a data link control (DLC) header, a transmission header (TH), a request/response header (RH), a request/response unit (RU) and a DLC trailer. The GDS variable comprises a GDS header, which is the combination of length (LL) and identifier (ID) followed by data or information.

As is well known, the BLU fields are concatenated and transmit information through the network. The BLU, when encoded according to the teachings of our invention, is a LOCATE message. In particular, we have invented new GDS variables which are encoded in the RU of the BLU for practicing our invention. The directory searches, in accordance with our invention, use the GDS variables as a means of communication. It should be noted that the order of GDS variables or control vectors within a GDS variable is arbitrary except where a given order is explicitly stated. For simplicity, we have shown a single order throughout the remainder of the specification.

GENERAL LOCATE FORMATS

The LOCATE message is the flow that nodes exchange in an effort to locate the destination resource. FIG. 2 illustrates the general format for the LOCATE message. LOCATE message is a short-hand term for a message that contains either a LOCATE GDS Variable and FIND RESOURCE GDS Variable for a search request or a LOCATE GDS Variable and a FOUND RESOURCE GDS Variable for a search reply when the resource has been located (successful search reply). When a resource is not found (unsuccessful search reply), the negative reply contains only a LOCATE GDS variable. The order of the GDS variables in these flows is unimportant. LOCATE GDS Variable contains information to control the delivery of the search messages in the network. FIND RESOURCE and FOUND RESOURCE GDS Variables contain information used in the directories: data about origin resources that should be cached by the destination and resource type and name being requested (referred to as the "Search Argument") are in the former, and located resource information is in the latter. The located resource information is also cached at the NNCP (originating LU or OLU). A significant feature of the LOCATE message is that it is independent of other functions which may be performed by other GDS variables that accompany during the searching process, such as initiating a "BIND", notification of the availability of the resource, etc. The length of a LOCATE message (including any other GDS variables that might be included) is limited to 1000 bytes in our embodiment.

LOCATE X'12C4') GDS VARIABLE FORMAT

Figure 4:
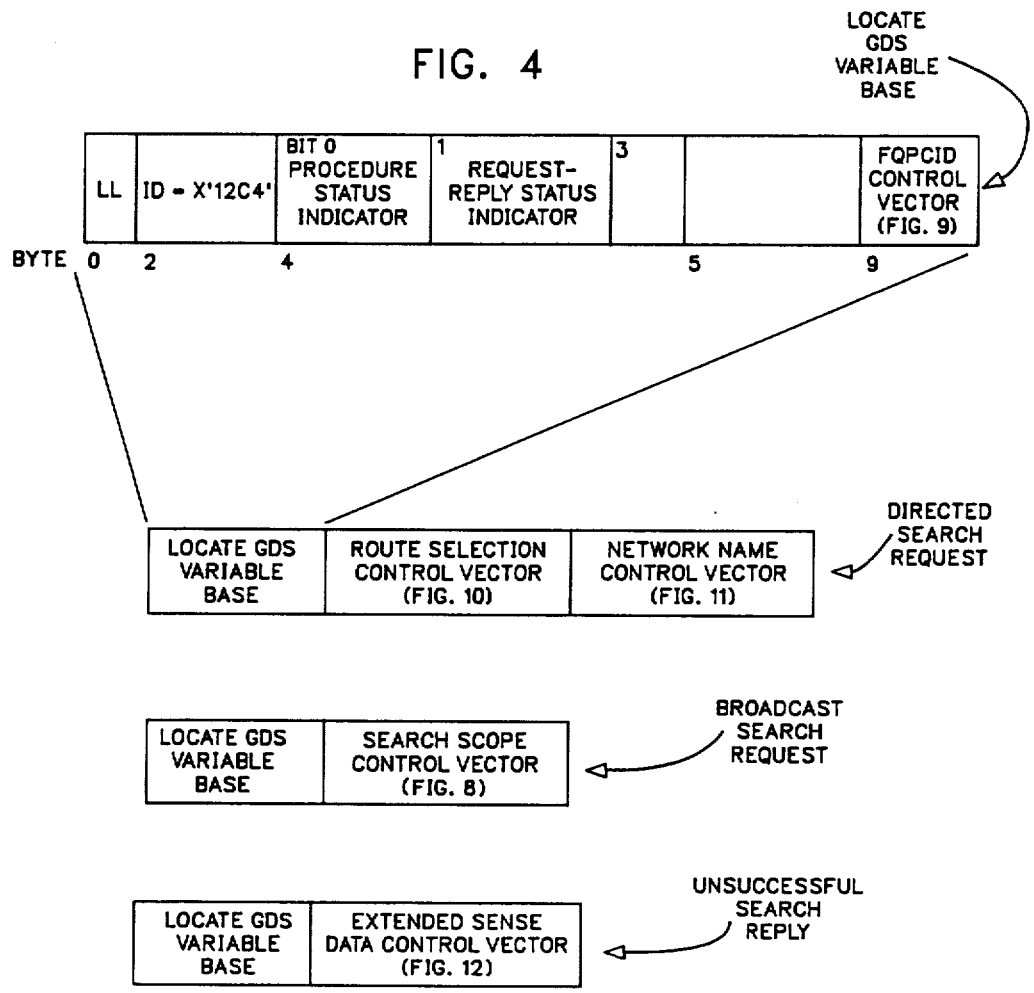
FIG. 4 shows the format for the LOCATE GDS variable base as well as the formats for a directed search request, a broadcast search request, and a failed search reply of the LOCATE procedure, all in accordance with our invention.

Turning now to FIG. 4, LOCATE (X'12C4') is used to transport the required information between directory servers in the network's distributed directory and from EN to its serving NN. It has the following format:

Bytes 0-1: Length (in bytes), in binary, of the GDS Variable including the Length field.

Bytes 2-3: LOCATE GDS Variable key: X'12C4'.

Byte 4, bit 0: The Procedure Status Indicator is used to signal the end of the procedure. This Indicator is reset on the last reply to a LOCATE search to indicate that the directory service procedure is completed. The procedure may complete normally when replies are received for all outstanding requests; it may complete abnormally when a CP-CP session outage causes the procedure chain to be broken. In our preferred embodiment, bit value 0 indicates "discard" and bit value 1 indicates "keep." The use of the Procedure Status Indicator will be more fully discussed hereinafter.

Byte 4, bits 1-2: The Request-Reply Status Indicator indicates whether the LOCATE (X'12C4') is a request or a reply. A reply may be a partial reply, in which case, more replies will follow; it may be completely self-contained or the last in a series of replies. If the reply does not contain all of the located resources in the sender's subtree, that condition is indicated in the final reply message. In our preferred embodiment, bit value 00 indicates a request, 01 an incomplete reply, 10 and 11 a partial reply (differentiated by ability to retry the procedure).

Byte 4, bits 3-7: Reserved.

Bytes 5-8: Reserved.

Bytes 9-n: FQPCID Control Vector (see FIG. 9)

For a directed search between servers (Directed Search Request), the Network Name (X'OE') Control Vector (see FIG. 11) and the Route Selection (X'2B') Control Vector (RSCV) (see FIG. 10) are added to indicate the path to be taken. The RSCV indicates the path between servers. The Network Name (X'OE') Control Vector that is not in the RSCV names identifies the destination control point and is included when the destination control point is not a server.

The Search Scope Control Vector (X'80') (see FIG. 8) provides information to control the search to a specified radius in a broadcast (Broadcast Search Request).

The Extended Sense Data (X'35') Control Vector (see FIG. 12) provides error source information when a negative LOCATE reply is generated because of a procedure error (Unsuccessful Search Reply).

USE OF THE PROCEDURE STATUS BIT IN LOCATE

When a LOCATE search is sent through the network, information must be retained at the intermediate nodes in the search path for routing the search reply. The LOCATE carries a procedure status indicator (byte 4, bit 0) that controls the creation and maintenance of control blocks at the intermediate nodes in the search path. These control blocks are used only as a path to return the search reply and are destroyed once the reply has been forwarded.

On both directed and broadcast searches, the search request is sent on a LOCATE(keep). The "keep" (i.e., procedure status indicator = 1) causes each node along the path of the LOCATE to retain information pointing to the node from which it received the LOCATE and to the node (or nodes) to which it forwards the LOCATE. This information, or control block, ensures that the LOCATE reply can be routed back to the origin. The request-reply status indicator in the LOCATE (byte 4, bits 1-2) is set to B'00' indicating a request.

Once the destination returns a complete reply, there is no need to retain the addressability between the origin and destination nodes. The destination returns a LOCATE(discard) in the search reply indicating that the control block should be discarded; the LOCATE has a request-reply status of B'10' or B'11', indicating a complete reply. Each intermediate node forwards the LOCATE(discard) and destroys its control block for the search.

The procedure status indicator is used for a broadcast search in much the same way as for a directed search. Search control blocks are retained only long enough to return the LOCATE reply and then are discarded. The only difference in the use of the procedure status indicator for the broadcast search stems from the tree structure of the broadcast, which allows a single mode to send LOCATEs to multiple nodes and to receive multiple replies. When a node in the broadcast search path fans out the LOCATE to its children in the broadcast tree, it sets the procedure status to keep (i.e., =1) to cause receivers of the LOCATE to create control blocks pointing to their parent and children in the search tree. Again, this trail of control blocks is used to route the LOCATE reply back to the search origin.

Normally, a node waits for replies from its entire subtree (i.e., the nodes to which it has sent LOCATE(keep)s) before sending a LOCATE(discard) search reply to its parent. However, if a node receives a LOCATE with a FOUND(i.e., a +reply to the search) from one of its children, the broadcast procedure requires that the node forward the +reply immediately, regardless of whether all of its children have responded or not. If the FOUND comes from the last outstanding child, the node will send to its parent a LOCATE(discard) with the Request-Reply Status Indicator (byte 4, bits 1-2) set to B'10' or B'11' indicating that the node's subtree search has completed. A FOUND with the destination information will also be included on this flow. If this was not the last outstanding child, the node will send to its parent a LOCATE(keep) with the request-reply indicator set to B'01' indicating that the node's subtree search has not completed and the parent should retain the control block for this branch of the broadcast. A FOUND is included on this flow. Later, when this node's subtree completes, it will send to its parent a LOCATE(discard) with the request-reply status indicator set to B'10' or B'11' since the subtree has completed.

Because the keep/discard indicator is independent of all other indicators, the LOCATE can be extended to uses that vary the requirements for keeping a connectivity chain between different nodes without requiring any understanding of the new function by intermediate nodes.

FIND RESOURCE (X'12CA') GDS Variable Format

Figure 5:
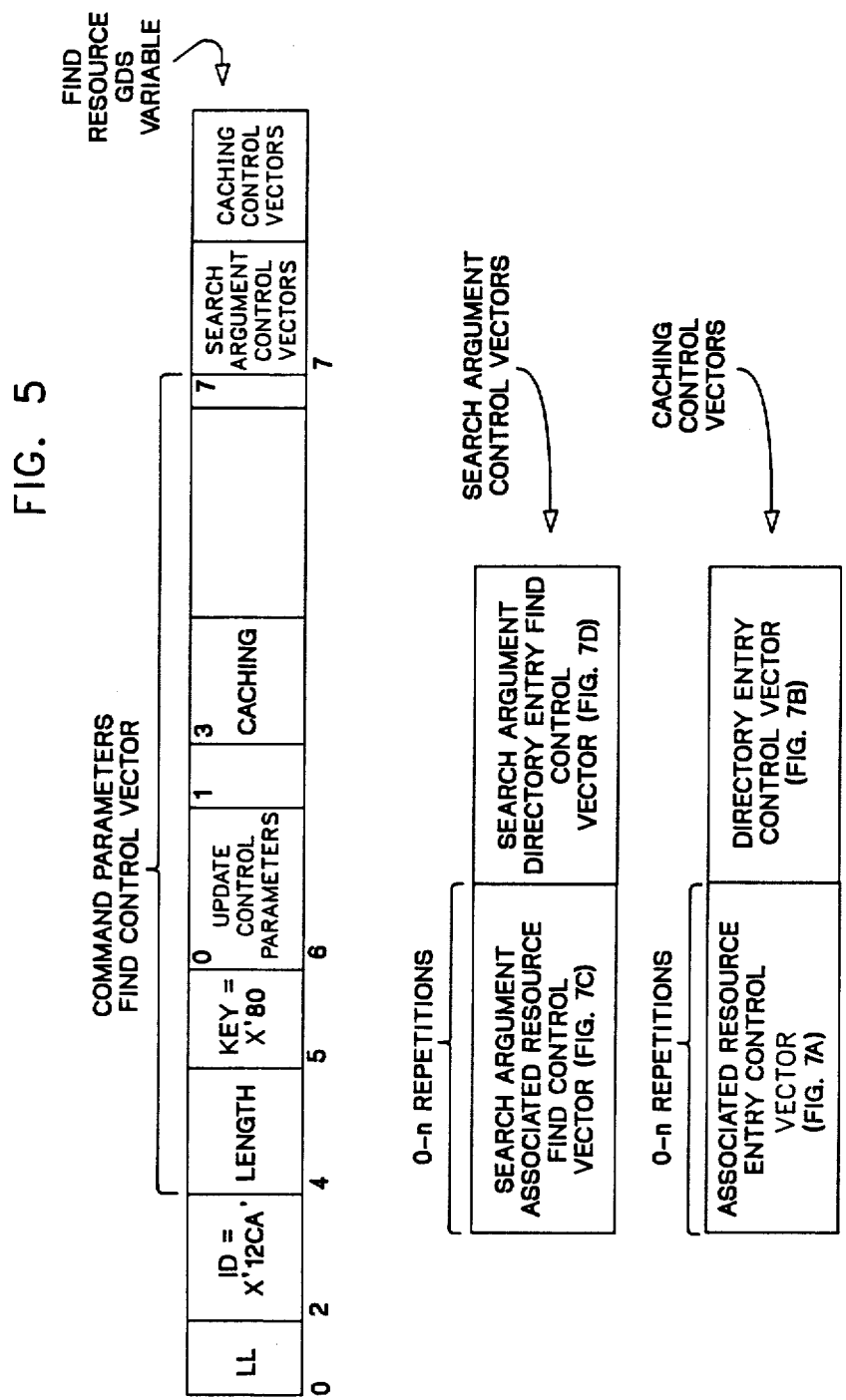
FIG. 5 shows the format for the GDS variable FIND RESOURCE as well as the formats for the search argument control vectors and the caching control vectors contained in FIND RESOURCE, all in accordance with our invention.

Turning now to FIG. 5, each search request, either directed or broadcast, contains a FIND RESOURCE (X'12CA') GDS Variable that describes the search argument and provides the destination node and the origin NN series when the requester is an EN with the data about origin resources that should be cached by the destination the origin NN serves. On a directed search, only the destination control point examines the FIND RESOURCE (X'12CA'); on a broadcast, all nodes in the search path examine the FIND RESOURCE (X'12CA').

The format is as follows:
Byte 0-1: Length, in binary, of the GDS Variable including the Length field.
Byte 2-3: Find Resource GDS Variable Key: X'12CA'
Bytes 4-n: Control vectors.

COMMAND PARAMETERS (X'80') FIND Control Vector

Byte 4: Length, in binary, of the control vector including the length field.
Byte 5: Command Parameters FIND Control Vector Key = X'80'
Byte 6: bit 0: Update Control Parameters; when this bit = 0, bits 3-4 are reserved; when this bit = 1, bits 3-4 control the caching operation of the origin node information at the server of the destination.
Byte 6, bits 1-2: Reserved.
Byte 6, bits 2-3: Set to B'00' to cause the destination server to cache the origin node information.
Byte 6, bits 5-7: Reserved.

The Command Parameters (X'80') FIND Control Vector is always present and is always the first vector in the FIND. The command parameters are controlling the caching operation at the destination server. The update control parameters are set to cause a cache entry to be created: B'00'.

The Associated Resource Entry (X'3C') control vector (shown in FIG. 7A) and the Directory Entry (X'3D') control vector (shown in FIG. 7B) ( the Caching Control Vectors in FIG. 5) are used to specify the search origin information to be cached at the destination server and the NN(OLU) if the requestor is an EN. The most general case, where the origin LU is not the origin CP and the origin CP is not the origin server, requires two associated resource entries and the one directory entry: the server, the EN, and the LU respectively. If the LU's CP is a server node, only one Associated Resource Entry (X'3C') Control Vector and the Directory Entry (X'3D') Control Vector are required; if the LU=CP=the server, only the Directory Entry (X'3D') Control Vector is used. The Resource Type field used in the X'3C' and X'3D' control vectors are the least general possible for the given NAU: when the LU=CP=the server, the resource type is X'00F6' for the server node control point; when the LU=CP, the resource type is X'00F4' for the EN control point; when the LU is not the CP, the resource type is X'00F3' for the LU.

The search argument is contained in the following FIND-specific control vectors: Search Argument Associated Resource (X'81') FIND Control Vector (shown in FIG. 7C), Search Argument Directory Entry (X'82') FIND Control Vector (shown in FIG. 7E) (the Search Argument Control Vector in FIG. 5).

FOUND RESOURCE (X'12CB') GDS VARIABLE FORMAT

When a search argument is located, the FOUND RESOURCE (X'12CB') GDS Variable provides the resource location—LU name, CP name, and server name.

Byte 0-1: Length, in binary, of the GDS Variable including the length field.

Byte 2-3: FOUND Resource GDS Variable key: X'12CB'.

Byte 4-n: Control Vectors

COMMAND PARAMETERS (X'80') FOUND CONTROL VECTOR

Byte 4: Length, in binary, of the control vector including the length field.

Byte 5: Command Parameters FOUND Control Vector Key:X'80'.

Byte 6, bit 0: Update Control Parameters: When this bit=0, bits 3-4 are reserved; when this bit=1, bits 3-4 control the caching operation of the destination node information at the origin server.

Byte 6, bits 1-2: Reserved.

Byte 6, bits 3-4: Set to B'00' to cause a cache entry to be created at the origin server.

Byte 6, bits 5-7: Reserved.

Byte 4-n: The FOUND GDS Variable data contains a number of control vectors, some of which are always present, some conditionally present, and some optionally present.

A Command Parameters (X'80') FOUND Control Vector is always present and is the first control vector in the data. The command parameters control the caching operation at the origin server and the NN (DLU) if the resource is located on an EN.

Associated Resource Entry (X'3C') Control Vectors (FIG. 7A) are conditionally present. Each Associated Resource Entry (X'3C') Control Vector provides the name and type of a resource that is hierarchically related to the directory entry (provided in Directory Entry (X'3D') Control Vector). The associated resources represent the location of the search argument.

When received by the search origin, if the associated resource is not in the directory, it is added.

The Directory Entry (X'3D') Control Vector (FIG. 7B) is sent by the destination node to supply the resource to the search origin.

ASSOCIATED RESOURCE ENTRY (X'3C') CONTROL VECTOR FORMAT

See FIG. 7A.

Byte 0: Length, in binary, of the control vector including the length field.

Byte 1: Associated Resource Entry Control Vector Key:X'3C'

Byte 2-3: Resource type.

Bytes 4-n: Resource name.

DIRECTORY ENTRY (X'3D') CONTROL VECTOR FORMAT

See FIG. 7B.

Bytes 0: Length, in binary, of the control vector including the length field.

Byte 1: Directory Entry Control Vector Key:X'3D'

Bytes 2-3: Resource type.

Bytes 4-n: Resource name.

SEARCH ARGUMENT ASSOCIATED RESOURCE (X'81') FIND CONTROL VECTOR FORMAT

The Search Argument Associated Resource (X'81') FIND Control Vector specifies the qualifying hierarchy, if any, for the search argument. It is shown in FIG. 7C and is used when searching for a resource (as specified by a Search Argument Directory FIND Control Vector) that may be replicated in the network and only one specific instance is satisfactory. This Control Vector, then, provides location qualification to be used in the search to scope the directory database search to a given LU or CP. The Resource Name field may be a network-qualified name, or it may be elided to default to the receiver's NETID or to the NETID of a resource above in the hierarchy.

Byte 0: Length, in binary, of the Control Vector, including the length field.

Byte 1: Search Argument Associated Resource FIND Control Vector Key:X'81'

Bytes 2-3: Resource type.

Bytes 4-n: Resource name.

SEARCH ARGUMENT DIRECTORY ENTRY (X'82') FIND CONTROL VECTOR FORMAT

The Search Argument Directory Entry (X'82') FIND Control vector specifies the search argument resource name and type (see FIG. 7D). As above, the NETID in the Resource Name field may be inherited from a qualifying resource or be defaulted to the receiver's NETID.

Byte 0: Length, in binary, of the Control Vector including the Length Field

Byte 1: Search Argument Directory Entry FIND Control Vector Key:X'81'

Byte 2-3: Resource type.

Byte 4-m: Resource name.

SEARCH SCOPE (X'80') LOCATE CONTROL VECTOR FORMAT

Referring now to FIG. 8, the search scope (X'80') LOCATE control vector provides information to control the search scope in a broadcast to a specified radius. The format is as follows:

Byte 0: Length, in binary, of the control vector including the length field

Byte 1: Search Scope LOCATE Control Vector Key: X'80'.

Byte 2: The broadcast radius is set on broadcast searches to indicate the maximum number of hops that the search is permitted to traverse before terminating. Each intermediate server on the broadcast path decrements the value; when it is zero, a negative reply is returned if the node that caused it to become zero does not find the resource in its directory. A radius of X'FF' guarantees that all broadcast searches will eventually terminate even in the presence of errors; it is the default value for all broadcasts originating at the search origin server and at central directories. A product may choose to allow the customer to alter this parameter on a par-search basis at the origin CP.

FULLY-QUALIFIED PCID (X'60) CONTROL VECTOR FORMAT

Figure 9:
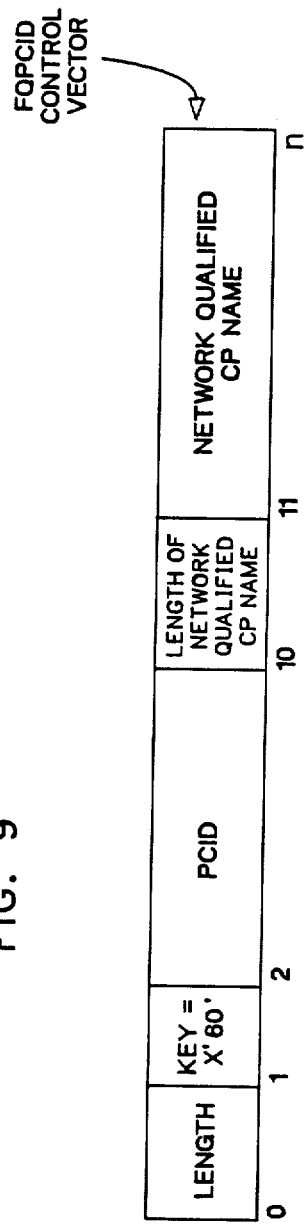
FIG. 9 shows the format for a Fully Qualified Procedure Correlation Identifier (FQPCID) Control Vector.

This format is shown in FIG. 9.

Byte 0: Length, in binary, of the control vector including the length field

Byte 1: Fully-qualified PCID control vector Key X'60'

Bytes 2-9: PCID

Byte 10: Length of network-qualified CP name

Byte 11-n: Network-qualified CP name.

ROUTE SELECTION (X'2B') CONTROL VECTOR FORMAT

Figure 10:
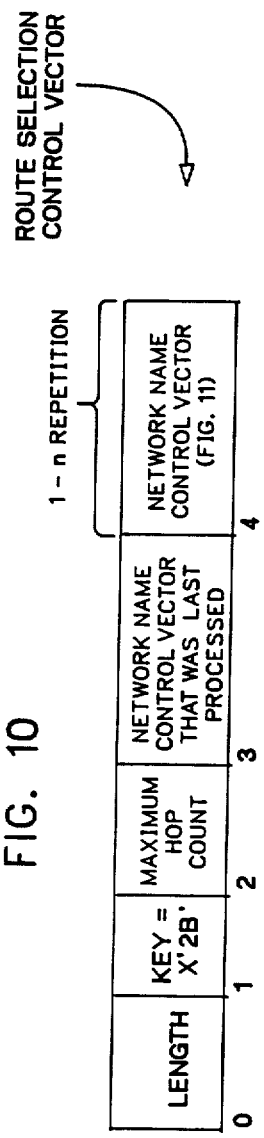
FIG. 10 shows the format for a Route Selection Control Vector as used in a directed search.

The Route Selection control vector is carried in BIND and the directed LOCATE to describe a path. FIG. 10 shows the format used for a directed LOCATE.

Byte 0: Length, in binary, of the control vector including the length field

Byte 1: Route Selection Control Vector Key:X'2B'

Byte 2: Maximum hop count: the number, in binary, of Network Name control vectors in the Route Selection control vector Byte 3: Current hop count: the number, in binary, of the last Network Name control vector that was processed Bytes 4-n: Control Vectors, Network Name (X'0E'), one for each CP on the procedure path not including the origin.

NETWORK NAME (X'0E') CONTROL VECTOR FORMAT

Figure 11:
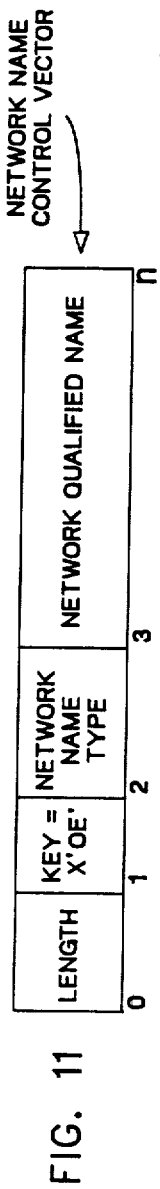
FIG. 11 shows the format for a Network Control Vector.

This format is shown in FIG. 11.

Byte 0: Length, in binary, of the control vector including the length field

Byte 1: Network Name Control Vector; Key X'0E'

Byte 2: Network name type:
X'F3' LU name
X'F4'CP name
X'F6'NNCP name

Byte 3-n: Network-qualified name: a 1- to 17-byte name consisting of an optional 1-8 byte qualifier and period (".") concatenated to a 1- to 8-byte name. The network-qualified name appears as follows: NETID.-NAME, with no imbedded blanks and with optional but not significant trailing blanks.

EXTENDED SENSE DATA (X'35') CONTROL VECTOR FORMAT

Figure 12:
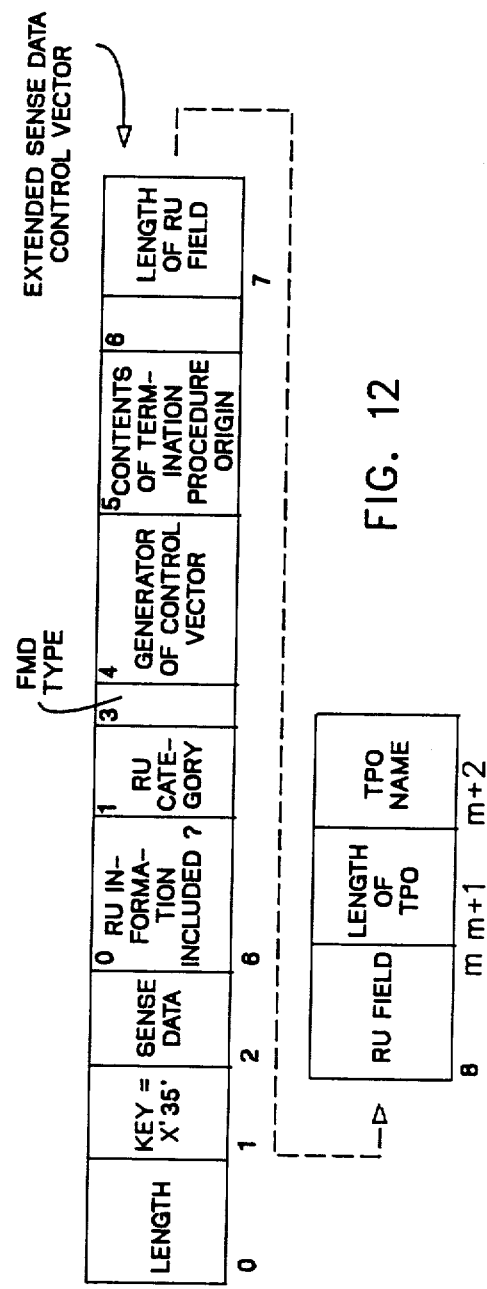
FIG. 12 shows the format for an Extended Sense Date Control Vector.

This format is shown in FIG. 12.

Byte 0: Length, in binary, of the control vector including the length field

Byte 1: Extended Sense Data Control Vector key:X'35'

Byte 2-5: Sense data

Byte 6: bit 0, RU information included
  0 RU information not included (bits 1-2 set to B'00' and Byte 8-m are not included)
  1 RU information included (see Bytes 8-m below)
  bits 1-2, RU category (reserved when bit 0=0)
  00 FMD
  01 NC
  10 DFC
  11 SC
  bit 3, FMD type
  B'0' not a GDS Variable
  B'1' a GDS variable
  bit 4, generator of extended sense data control vector (reserved when Termination Procedure Origin Name field not present)
  0 extended sense data control vector generated by the termination procedure origin;
  1 extended sense data control vector generated by a node other than the termination procedure origin
  bit 5, contents of Termination Procedure Origin Name field (reserved when Termination Procedure Origin Name field not present);
  0 termination procedure origin name
  1 name of node other than termination procedure origin, as described below; termination procedure origin name not known
  bits 6-7, reserved Byte 7: Length of RU Identifier field (set to zero when byte 6, bit 0=0)

Byte 8-m: Identifier: request code or NS header or GDS key (If present, this field identifies the request or response that triggered the generation of the extended sense data control vector.)

Byte m+1: Length of Termination Procedure Origin Name field (values 3 to 26 are valid)

Byte m+2-n: Termination procedure origin name: if the field contains the termination procedure origin name (see byte 6, bit 5), network-qualified name of the node that caused the session termination procedure to be executed; otherwise, the network-qualified name of the node that generated the extended sense data control vector with, when available, a local or network name that indicates the direction from which the RU signalling the termination procedure was received.

Figure 14B:
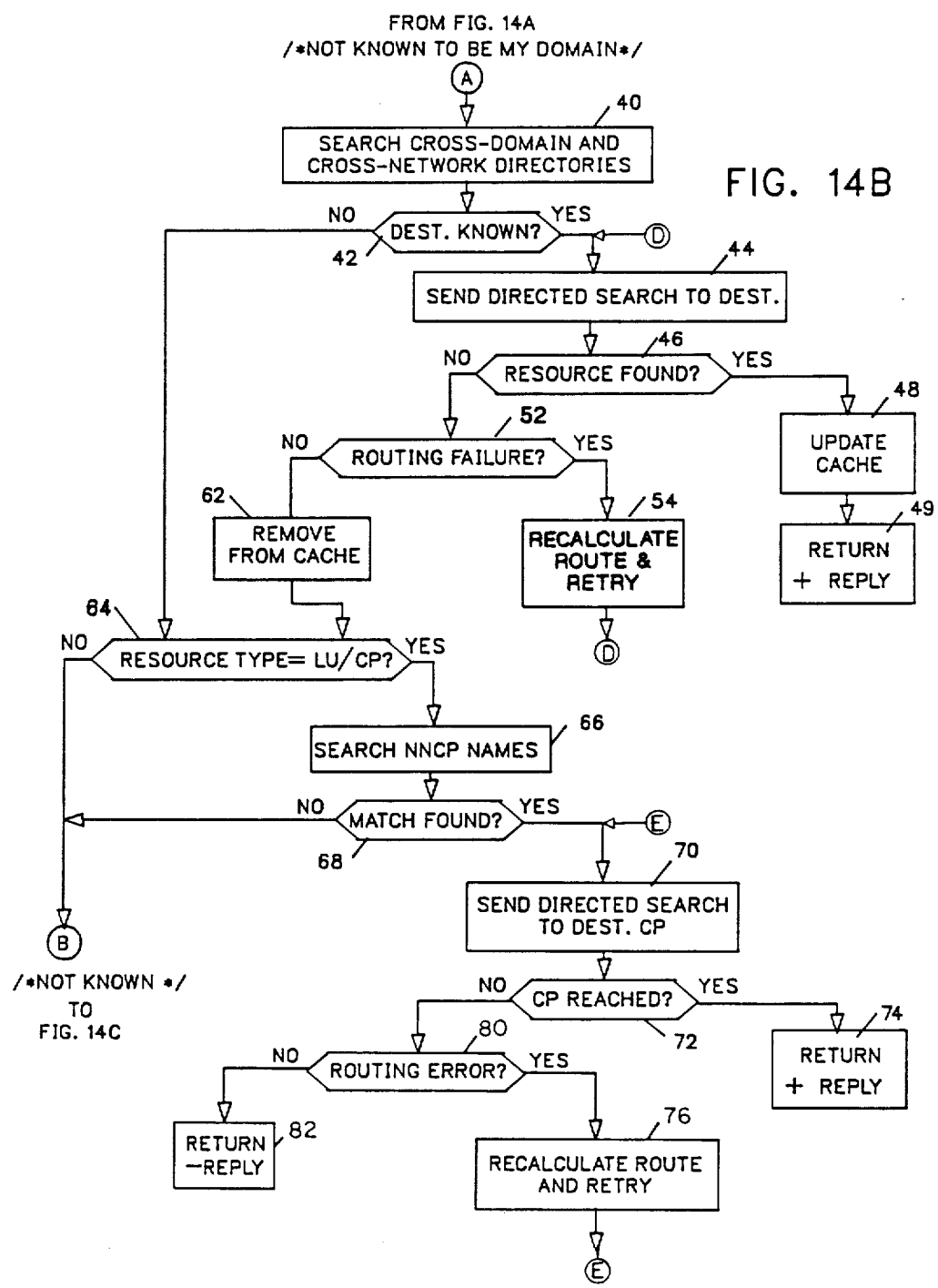

FIGS. 13 and 14 are flow charts of a computer program for locating resources in accordance with our invention. In FIG. 13 an EN such as EN 220 in FIG. 1 initiates a search for a resource. Initially, as shown in block 10, it searches its own directory. If the resource is known, as shown in decision block 12, a positive return reply is returned as shown in block 14. If the destination entry is not found, the search request is routed to the server NN of the requesting EN.

As shown in FIG. 14A, the server NN searches its own domain directory, i.e., its own directory and also those entries defined or cached as being on the ENs which it serves. For example, in FIG. 1, NN2 has a domain which comprises ENs 210, 220 and 230. After the domain database search, a decision is made as to whether the search was successful at decision block 22.

If the answer is yes, a decision is made as to whether the destination is on the server NN (this node) as shown in decision block 24. If the answer is yes, a positive reply is returned as shown in block 26. If the answer in decision block 24 is no, then the entry is on a served EN and a decision is made in block 28 as to whether the EN supports the LOCATE function. If the answer is no, a positive reply is returned on behalf of the EN as shown in block 29. If the answer is yes, the LOCATE search is sent to that EN which supports LOCATE as shown in block 30. A decision is made in decision block 34 as to whether a positive return reply has been received from the EN. If the answer is yes, the cache associated with the server NN is then refreshed as shown in block 32, and a positive reply is returned as shown in block 38. If the answer is no, the entry is deleted from the cache of the NN, the resource is no longer known to be in domain of the server and the program continues to FIG. 14B. Returning to decision block 22, if the resource is not known to be in the domain of the server NN, the program continues to FIG. 14B.

As shown in block 40, a search of the cross-domain and cross-network directories is then initiated by the server NN of the node that initially requested the search. These directories are caches which are contained in the server NN. A decision is made by the program as to whether the destination was known in one of these directories as shown in decision block 42. If the answer is yes, a directed search is sent to that destination as shown in block 44.

A decision is made in decision block 46 as to whether the resource was found at that destination. If the answer is yes, the cache contained in the server NN is refreshed and a positive reply is returned to the requestor as shown in blocks 48 and 49. If a decision is made in decision block 46 that the resource has not been found, a decision is made in decision block 52 as to whether the failure was the result of a routing failure. If the answer is yes, the route is recalculated and retried as shown in block 54. The route recalculation and retry may be attempted a number of times. A decision is then made as to whether the resource was found on this retry as shown in decision block 46. If the answer is yes, the cache is refreshed and a positive reply is returned as shown in blocks 48 and 49. If a decision in block 46 is made that the resource was not found, on the first try or any retry and no routing failure is found in block 52, the entry is removed from the cache of the server as shown in block 62.

After the entry is removed from the cache, a decision is made in decision block 64 as to whether the destination resource is an LU or a control point (as compared to other resources such as a transaction program or file). If the resource type is an LU or CP, a search is made of the topology database, which contains all NNCP names in the network, as shown in block 66. A decision is made as to whether a CP name matched the resource name in decision block 68. If there is a match, a directed search is sent to the destination CP containing the resource as shown in block 70. A decision is then made by the program in decision block 72 as to whether that CP has been reached. If the answer is yes, a positive reply is returned to the requestor node as shown in block 74. If the answer is no and a routing error is found in block 80 the route is recalculated and retried as shown in block 76. Again, this recalculation can be repeated some number of times. A decision is then made after the recalculation and retry as to whether the CP has been reached in decision block 72. If the answer is yes, a positive reply is returned as shown in block 74. If the answer is no and no routing error is found in block 80 a negative reply is returned as shown in block 82. If a match is not found (block 68), then the program decides that the resource is not known by the server NN.

Returning to block 42, if a decision is made that the destination has not been found in the cross-domain or cross-network directories, the output from decision block 42 goes directly to decision block 64 where a decision is made as previously described as to whether the resource type is an LU or a CP. If the answer is no, then the decision is made that the resource is not known by the server NN. If the resource type is an LU or CP, the program continues as previously described.

Turning now to FIG. 14C, if the resource is not known to the server NN because information concerning it is not contained in the NN's directory or in the topology database, a broadcast search is sent from the server NN to the EN's in its domain that support the LOCATE function and support receipt of LOCATE for resources of the same resource type as the destination being sought as shown in block 90. A decision in block 92 is made as to whether the resource is found. If the answer is yes, the information concerning its location is entered into the cache of the server NN as shown in block 94 and a positive reply is returned to the requestor as shown in block 96. If the resource is not found, a decision is made as to whether there is a central directory (CD) in the network as shown in decision block 98. If a CD is in the network, a directed search is sent to the CD as shown in block 100.

CD nodes identify themselves with an indicator in the topology database update messages. CD nodes are obligated to provide a large cache of directory entries.

When CD nodes are present in a network, the search algorithms use the closest CD node whenever a destination LU is not located in the domain of the network node server of the origin LU and that NNCP and the NNCP(OLU) was unable to locate the destination LU using a directed LOCATE. The CD, then, takes responsibility for locating the destination either by a directed LOCATE if the destination LU appears in its cached directory or by a broadcast search if it does not.

Referring again to FIG. 14C, a decision is made in decision block 102 as to whether the directed search at the central directory has located the resource. If the answer is yes, the name of the CP containing the resource and the server of that node are extracted from the reply and the entry is cached as shown in block 104 and a positive reply is returned as shown in block 106. If the decision from decision block 102 is no, a negative reply is returned as shown in block 108.

Returning to decision block 98, if there is no CD in the network, then a broadcast is sent to all NNs in the network. In particular, referring to FIG. 1, the broadcast would be sent to all NNs in network 50.

Figure 14D:
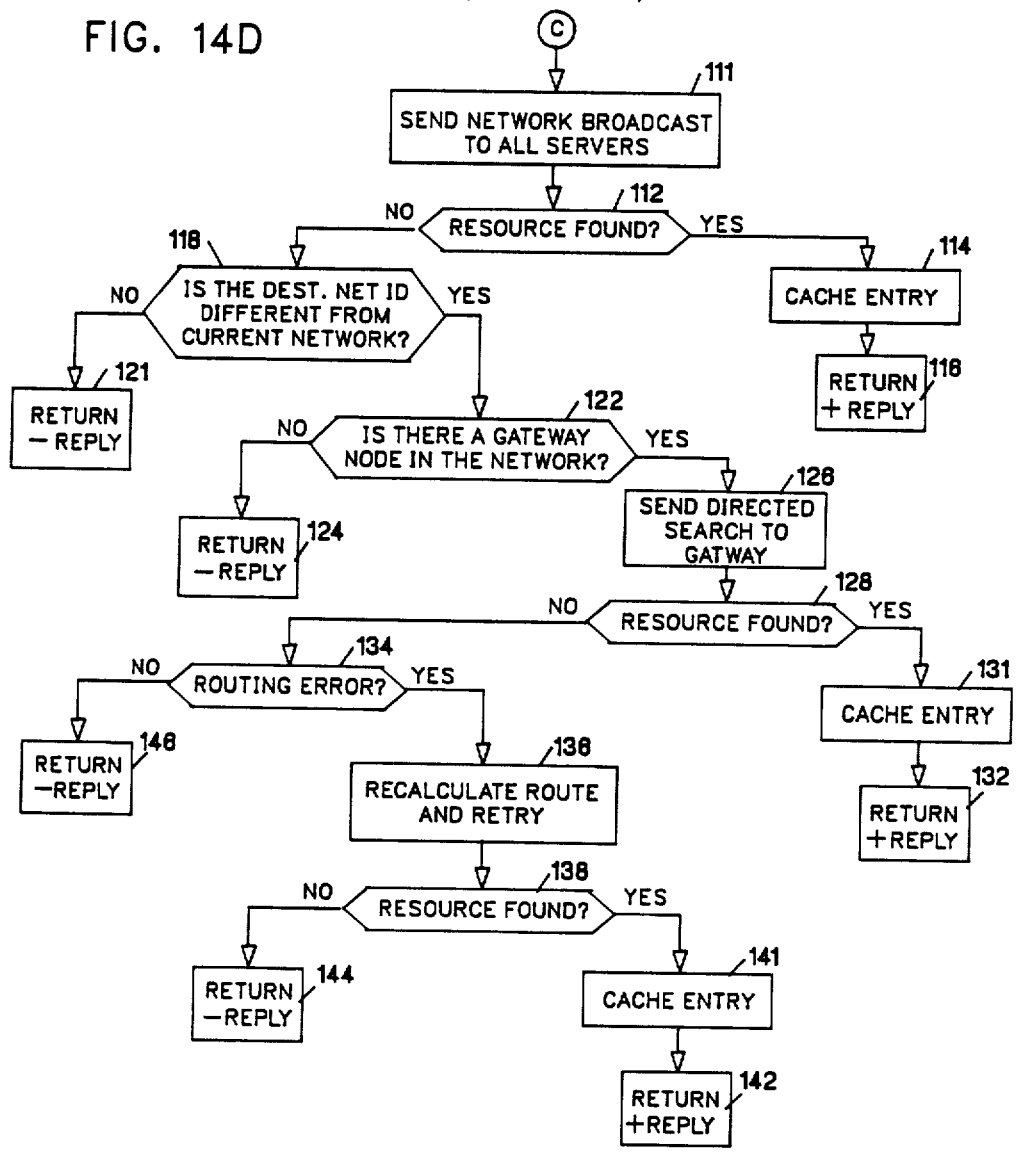

Turning now to FIG. 14D, a broadcast as described above is sent to all servers in the network as shown in block 111. A decision is made in decision block 112 as to whether or not the resource was found. If the answer is yes, the entry is cached in the server NN and a positive reply is returned to the requestor as shown in blocks 114 and 116. If the resource is not found, a decision is made in decision block 118 as to whether the network ID of the destination is different from the current network, in this case, network 50. If the ID is not different, then a negative reply is returned as shown in block 121, indicating that the resource was not found. If the destination ID is different from the current network, a decision is made as shown in decision block 122 as to whether there is a gateway node in the network. Gateway nodes identify themselves by an indication in topology database updates. If the answer is no, a negative reply is returned as shown in block 124. If the answer is yes, a directed search is sent to the gateway node as shown in block 126. A decision is then made based on the results of the directed search in decision block 128 as to whether the resource was found. If the answer is yes, the entry is cached and a positive reply is returned as shown in blocks 131 and 132. If the answer is no, a decision is made in decision block 134 as to whether the answer was caused by a routing error. If the answer is no, a negative reply is returned in block 146. If the answer in decision block 134 is yes, the route is recalculated and retried as shown in block 136. This recalculation and retry can be tried some number of times. A decision is then made after the recalculation and retry as to whether the resource was found as shown in decision block 138. If the answer is no, a negative reply is returned as shown in block 144. If the resource was found, the entry is cached and a positive reply is returned as shown in blocks 141 and 142.

FIG. 15 depicts the processing when a node receives a LOCATE request over a CP-CP session. The LOCATE is received in block 149. A LOCATE reply server does not need a new control block so it does not trigger this processing. In block 150, a decision is made whether there are any LOCATE control blocks available. If there are, the processing continues normally as described hereafter in FIG. 15B. If no control blocks are available, the node wants to reject the LOCATE as shown in block 159 and triggers processing to determine if the LOCATE can be rejected or if the node should be considered deadlocked with the sender of the message.

Blocks 152–156 illustrate the processing that detects a possible deadlock situation. In block 152 a check is made whether all LOCATE receive buffers are filled. If they are not, the directory component can reject the LOCATE by sending a LOCATE (discard) (block 155) and ends processing as indicated in block 158. If they are all filled, the directory component checks the send and receive pacing counts for the node that sent the LOCATE. If one of them is non-zero, processing continues as indicated by block 155. If they are both zero, the node is declared to be deadlocked with the message sender. As shown in block 156, the directory component notifies session services to unbind the CP-CP session. Session services will automatically send a BIND to restart its half of the CP-CP session as will the node at the other end of the CP-CP session. Normal session outage triggers the processing shown in FIG. 15C.

Figure 15A:
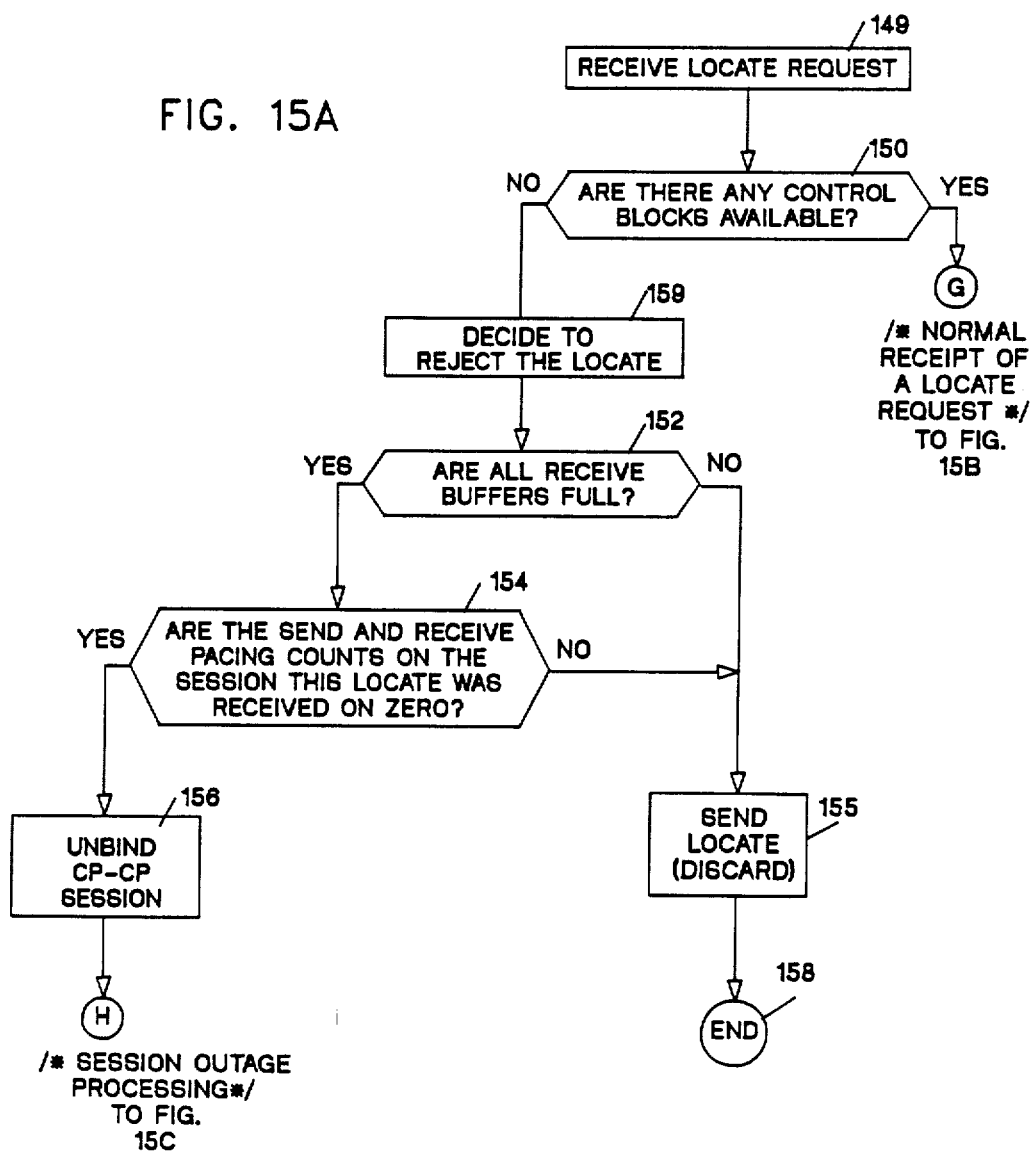

Returning to decision block 150, once it is determined that the LOCATE request can be processed, the node determines what type of LOCATE is involved as described in FIG. 15B.

In block 160, the LOCATE is examined to determine if it is an initial request from an end node. If it is, processing is performed as shown in FIG. 14 as indicated in block 162. If the LOCATE is not an initial request, the determination is made in node 164 as to whether it is a broadcast or a directed search. If it is not a directed search, it must be a broadcast search and processing continues as indicated in block 166 with intermediate broadcast functions. Intermediate broadcast functions are described earlier and consist of the checking the local domain and sending the broadcast request to all adjacent network nodes except the sender.

Processing is then completed as indicated in block 168.

If the determination in block 164 is made that the LOCATE is a directed search, the node examines the name of target of the directed search as in box 170.

If this node is not the target, it forwards the message as described in blocks 172–182.

In block 172, the node determines if there is an active CP-CP session between itself and the next node listed in the route selection control vector. If there is no such session, a LOCATE (discard) is returned to the node that sent the directed LOCATE, as shown in block 174. No record needs to be kept of the search and processing terminates as indicated in block 176.

If the determination in block 172 is that an active CP-CP session does exist to forward the LOCATE, a control block is created in block 178 to retain knowledge of the search and the LOCATE is forwarded in block 180.

The processing is completed in block 182.

Figure 15C:
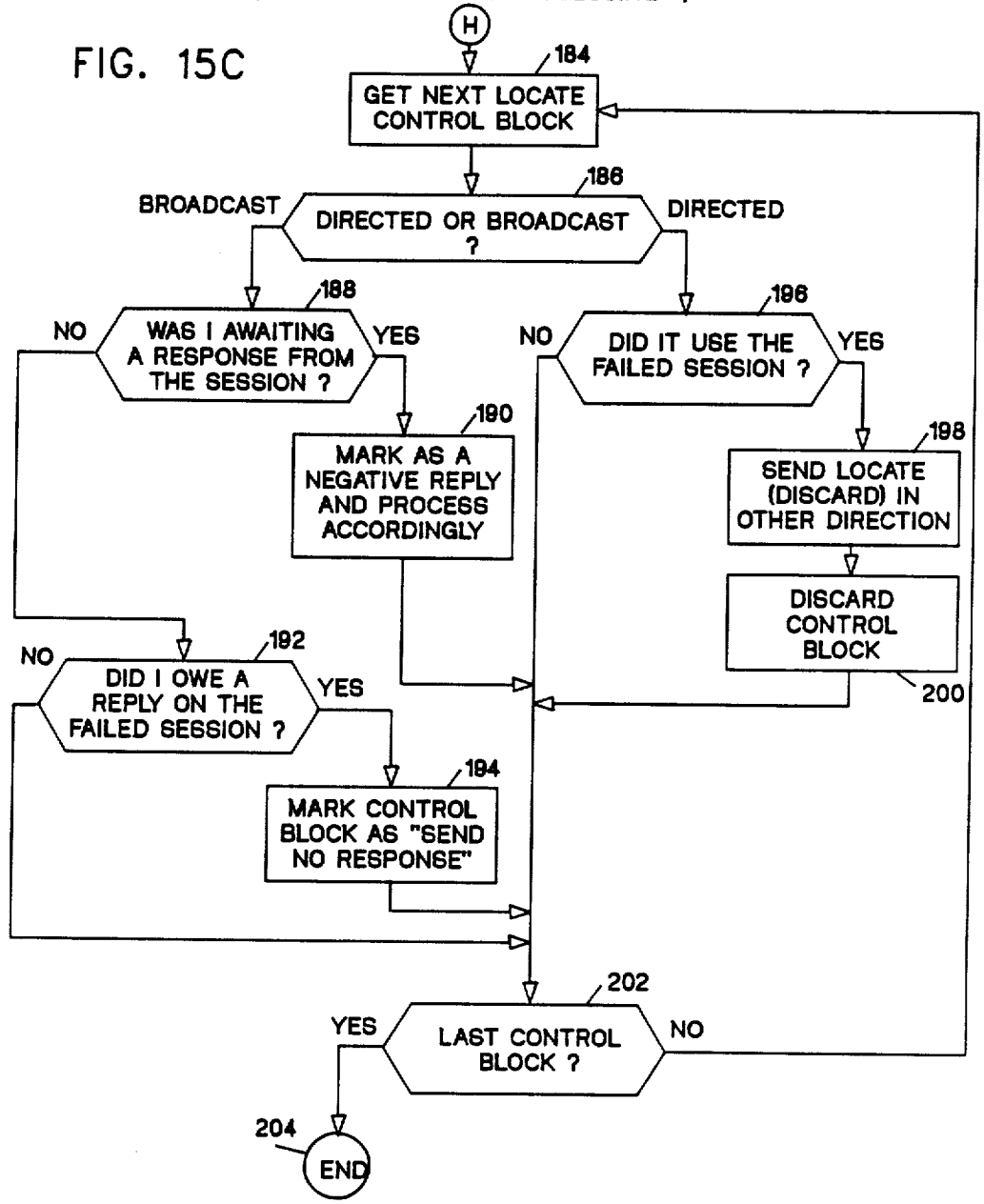

FIG. 15C shows the processing to be performed when the directory component is notified of a CP-CP session outage. Directory services reviews all outstanding searches by looking at each LOCATE control block, in turn, as in block 184, and determines appropriate action for that control block.

In block 186, a determination is made as to whether the LOCATE identified is a directed or a broadcast search.

If it is a directed search, the decision of block 196 is made. In this block it is determined whether the directed search used the failed CP-CP session on either the uptree or downtree side.

If it did not, processing of this control block is completed and processing continues with block 202.

If the determination in block 196 is that the directed LOCATE used the failed session, a LOCATE is sent in the opposite direction of the failed session indicating a routing failure and that control blocks for this directed LOCATE should be discarded. This is indicated in block 198.

After this LOCATE failure message is sent, the control block is discarded as in block 200. Processing of this control block is now complete and processing continues with block 202.

If the determination in block 186 is that the control block represented a broadcast search, block 188 explores the role of the failed session in the search. If the node is awaiting a reply from the failed session, block 190 marks the control block as having received a negative reply, saves the appropriate sense code if it takes precedence over the currently saved one, and processes it accordingly. If this was the last reply to be received, this processing will include returning a reply and discarding the control block; if it is not the last reply, no further processing is needed.

Once the negative reply is properly handled, processing is complete for this control block and control proceeds to block 202.

If the determination in block 188 is that no reply was outstanding, block 192 decides if the node owed a reply over the failed session. If a reply was owed, block 194 marks the control block with an indication not to send a reply even if the session is re-established. The control block is retained to assure proper completion of the broadcast search. Processing for this control block is then complete and processing continues with block 202.

If block 192 determined that no reply was owed over that session, processing of the control block is complete and the processing proceeds to block 202.

Block 202 determines if this was the last control block to be processed. If it is not, processing continues in block 184 with retrieving the next control block. If it is the last control block, session outage processing is complete as indicated in block 204.

Figure 15D:
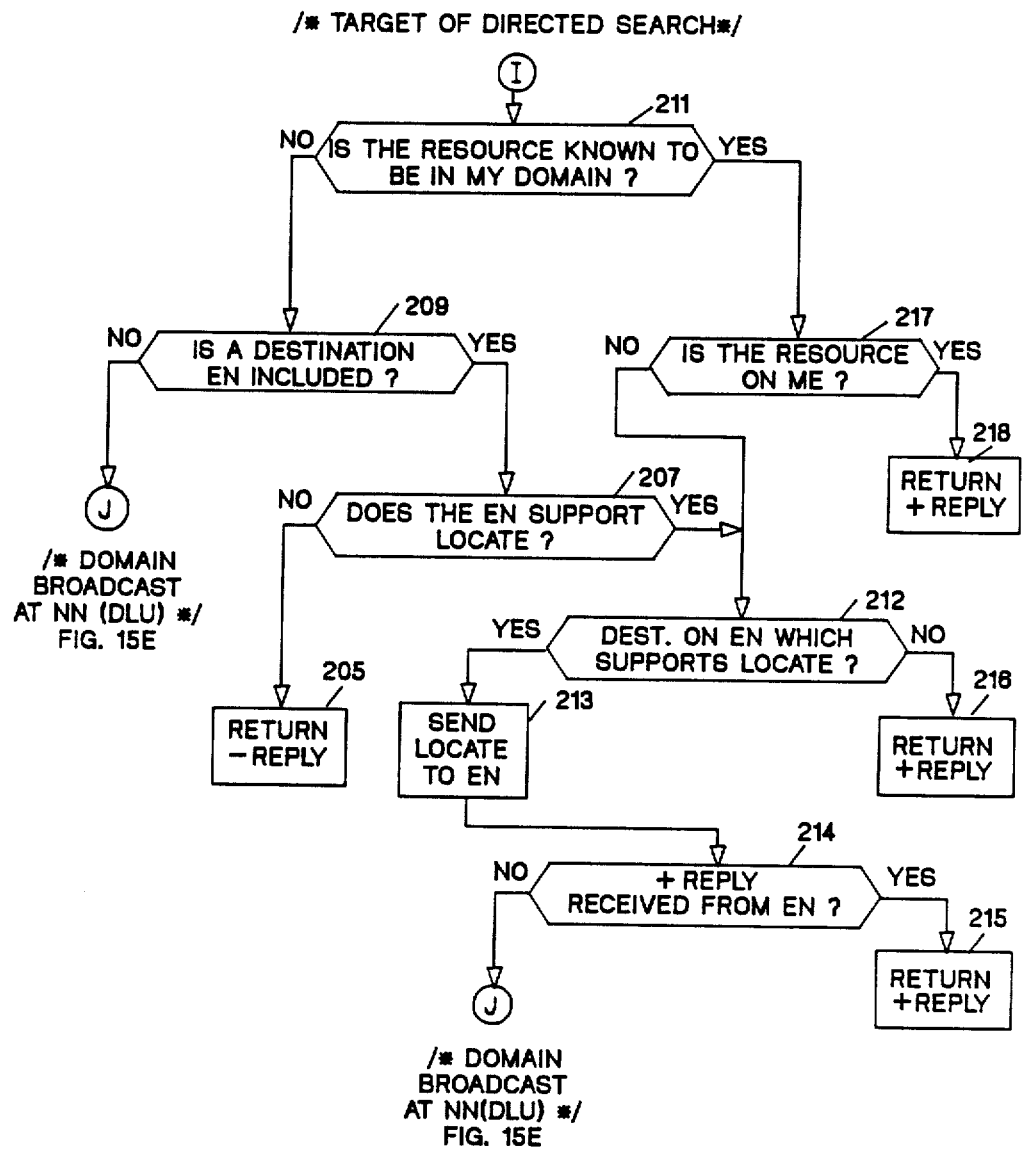

FIG. 15D depicts the processing performed by the target NN of a directed search.

In block 211 a determination is made whether the resource being sought is known by the NN to be in its domain. If it is, block 217 determines whether the resource is located at this node. If it is, a positive reply is returned according to block 218.

If it is not located at the node, it is located on an EN. Block 212 decides whether the EN it is on can accept a LOCATE query. If it cannot, a positive reply is returned in node 216. If the EN can accept a LOCATE query, the LOCATE is forwarded to the EN as in block 213. In block 214, a determination is made as to whether the reply from the EN is positive or negative. If it is positive, a positive reply is returned as in block 215. If the reply is negative, a domain broadcast is initiated as shown in FIG. 15E.

If it is determined in block 211 that the resource is not known to the NN to be in its domain, a determination is made in clock 209 if a destination EN was indicated in the LOCATE (i.e., a Network Name Control Vector was included). If it was not, a domain broadcast is initiated as shown in FIG. 15E. If the destination was included, block 207 determines if the EN indicated can receive LOCATE. If it cannot, it should not have been identified in the LOCATE message and a negative reply is returned in block 205. If the EN can accept a LOCATE, processing continues as described at block 213.

Figure 15E:
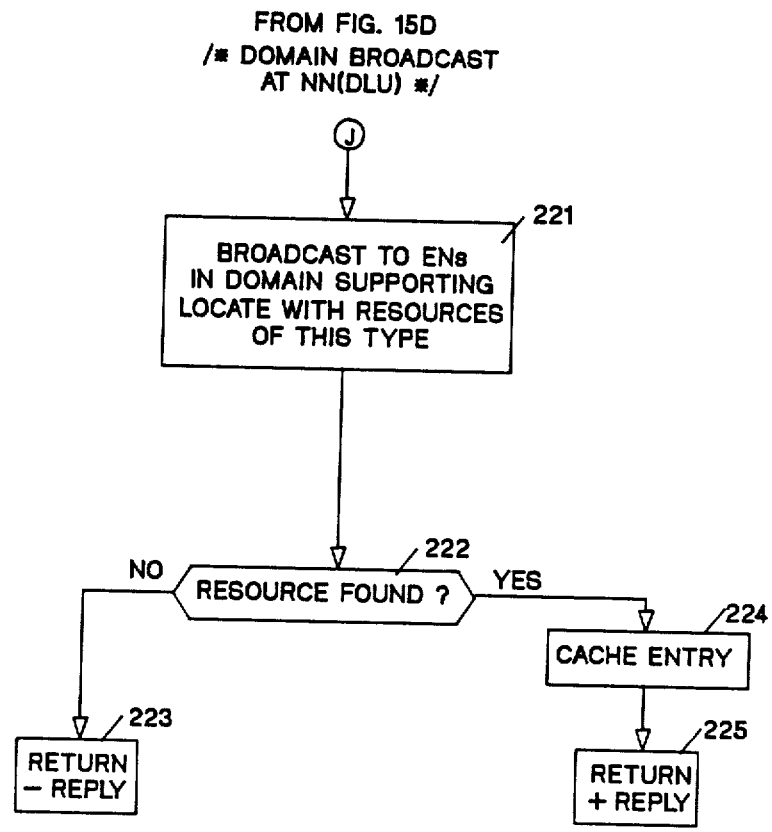

FIG. 15E illustrates a domain broadcast from an NN (DLU) to the ENs in its domain.

Block 221 shows a broadcast being sent to all ENs in the domain that support LOCATEs for unknown resources of the type sought in the directed search.

In block 222, a determination is made as to whether the resource was found. If it was found, the resource is cached in block 224, and a positive reply is returned in block 225. If the resource was not found, a negative reply is returned in block 223.

Although the foregoing invention has been particularly shown and described with reference to the preferred embodiment thereof, it will be understood by those skilled in the art that other changes in form may be made without departing from the spirit and scope of the invention.

We claim:

1. In a computer network which includes a plurality of end nodes and at least one server node, each of said nodes having a directory of resources associated with the node and each of said end nodes being associated with a server node, a method of locating a resource in response to a request by a requesting node, said requesting node being either an end node or a server node, said method being performed by computers in the network and comprising the steps of:

(a) searching the directory of the requesting node for an entry indicating the requested resource is resident at the requesting node;

(b) if no such entry is found in the requesting node directory and if the requesting node is an end node, then searching the directory of the server node for the requesting node for any entry indicating the location of the resource; and (c) if no such entry is found in the server node directory or of the requesting node is a server node, then searching the directories of end nodes associated with the server node for an entry indicating the resource is resident at one of said end nodes.

2. A method as defined in claim 1 comprising the further step of sending a resource search request to each server node in the network if no directory entry is found indicating the resource is resident at one of the nodes that has already been the subject of a directory search.

3. A method as defined in claim 2 comprising the further step of sending a resource search request to any gateway node connecting the originating network to other networks if no directory entry is found indicating the resource is resident at one of the nodes of the originating network.

4. A method as defined in claim 1 comprising the further step of sending a resource search request to any central directory in the network when no directory entry has been found indicating the resource is resident at the server node or at end nodes associated with the server node.

5. In a computer network which includes a plurality of end nodes and at least one server node, each of said nodes having a directory of resources associated with the node and each of said end nodes being associated with a server node, a system of locating a resource in response to a request by a requesting node, said requesting node being either an end node or a server node, said system including:

(a) control block means located at selected nodes for use in receiving and processing resource search requests; and (b) means for transmitting a search request message from a requesting node to at least one selected node having control block means, said message including a first variable which may be loaded into the control block means to control processing the search request at each selected node; and (c) means for processing a search request at each node receiving a search request message, said means being responsive to the contents of the control block.

6. A system as defined in claim 5 wherein said control block means further comprises procedure status indicator means for causing each node receiving a search request message either to discard the search request or to retain information identifying the nodes from which the search request was received and to which the search request was sent.

7. A system as defined in claim 5 wherein said variable further includes information defining a path and a destination node for the search request message and each node receiving the search request message further includes means responsive to said information to forward the search request along the path if the receiving node is not the identified destination node or to process the search request if the receiving node is the identified destination node.

8. A system as defined in claim 5 wherein said first variable further includes search scope information for defining a class of nodes to which the search request is to be broadcast and each of said nodes includes means responsive to the search scope information to carry out the search request only if the node falls within the defined class.

9. A system as defined in claim 5 wherein said message contains a second variable which describes the type and name of the resource being sought.

10. A system as defined in claim 5 further comprising means in the node at which the sought resource is resident for transmitting a reply message to the requesting node, said message including the first variable and the second variable.

11. A system as defined in claim 10 wherein the first variable contains information indicating whether message is a request, a complete reply or an incomplete reply.

12. A system as defined in claim 5 further including
 (a) buffer means for holding search request messages when storage is not available at the node for creation of control blocks; and
 (b) means for terminating a logical connection between a node receiving a message and the node from which the message was received when the buffer means are full and the two nodes attempt to exchange messages simultaneously.

* * * * *